US012782199B2

(12) United States Patent
Kreitle

(10) Patent No.: US 12,782,199 B2
(45) Date of Patent: Nov. 3, 2026

(54) SYSTEMS, APPARATUSES, AND METHODS FOR EVALUATING BURN TESTS

(71) Applicant: The Boeing Company, Arlington, VA (US)

(72) Inventor: Joseph J. Kreitle, Summerville, SC (US)

(73) Assignee: The Boeing Company, Arlington, VA (US)

( * ) Notice: Subject to any disclaimer, the term of this patent is extended or adjusted under 35 U.S.C. 154(b) by 517 days.

(21) Appl. No.: 18/340,276

(22) Filed: Jun. 23, 2023

(65) Prior Publication Data

US 2024/0426667 A1 Dec. 26, 2024

(51) Int. Cl.

| | |
|---|---|
| ***G01J 5/08*** | (2022.01) |
| ***G01J 5/02*** | (2022.01) |
| ***G01J 5/53*** | (2022.01) |
| ***G01J 5/90*** | (2022.01) |

(52) U.S. Cl.

CPC ............. *G01J 5/0814* (2022.01); *G01J 5/025* (2013.01); *G01J 5/027* (2013.01); *G01J 5/0846* (2013.01); *G01J 5/0859* (2013.01); *G01J 5/53* (2022.01); *G01J 5/90* (2022.01)

(58) Field of Classification Search

CPC .......... G01J 5/0814; G01J 5/025; G01J 5/027; G01J 5/0846; G01J 5/0859; G01J 5/53; G01J 5/90; G01N 25/38

USPC .......................................................... 374/130

See application file for complete search history.

(56) References Cited

U.S. PATENT DOCUMENTS

| | | | | |
|---|---|---|---|---|
| 3,545,252 A * | 12/1970 | Jeter | G01N 25/52 374/8 |
| 11,226,414 B2 | 1/2022 | Rezk et al. | |
| 11,304,604 B2 | 4/2022 | Dimaio et al. | |
| 11,906,453 B1 * | 2/2024 | Campbell | G01J 5/0018 |
| 2009/0015837 A1 * | 1/2009 | Behrendt | G01M 99/002 356/417 |
| 2009/0168833 A1 * | 7/2009 | Sarabi | G01N 25/50 374/8 |
| 2022/0349849 A1 | 11/2022 | Strasser et al. | |
| 2025/0172469 A1 * | 5/2025 | Göring | G01M 99/002 |

FOREIGN PATENT DOCUMENTS

| | | | |
|---|---|---|---|
| KR | 100686374 | 2/2007 | |
| WO | WO-02070953 A1 * | 9/2002 | F23N 5/082 |

OTHER PUBLICATIONS

International Electrotechnical Commission Guidelines EN 60695-11-10 Burn Tests (Year: 2013).*

Structure: “What are Structure Core’s technical specifications?” (Nov. 28, 2022). https://support.structure.io/article/307-what-are-structure-cores-technical-specifications.

14 CFR 25 https://www.ecfr.gov/current/title-14/chapter-I/subchapter-C/part-25?toc=1.

* cited by examiner

*Primary Examiner* — Kristina M Deherrera
*Assistant Examiner* — Evan Mancini
(74) *Attorney, Agent, or Firm* — Walters & Wasylyna LLC

(57) ABSTRACT

A system and method for evaluating a burn test includes using an optical sensor system to detect an infrared reflection of a flame on a test piece and using a computer to capture initiation of fire damage to the test piece using the infrared reflection and to capture the fire damage though cessation of the fire damage using the infrared reflection.

20 Claims, 10 Drawing Sheets

SYSTEMS, APPARATUSES, AND METHODS FOR EVALUATING BURN TESTS

FIELD

The present disclosure relates generally to burn damage testing and, more particularly, to systems, apparatuses, and methods for evaluating burn tests.

BACKGROUND

Many manufactured products must meet certain requirements and, thus, must be tested in some manner to evaluate whether the product complies with such requirements. As an example, many aerospace products must comply with certain regulatory requirements for fire resistance. As such, the materials used to manufacture many aerospace products are subjected to burn testing and then evaluated based on flammability requirements to demonstrate compliance with the applicable requirements. However, conventional burn testing techniques are subjective and rely on the visual observation of a human evaluator and then manual measurement and recordation of the evaluation criteria. Accordingly, those skilled in the art continue with research and development efforts in the field of evaluating burn tests.

SUMMARY

Disclosed are examples of a method for evaluating a burn test, a system for evaluating a burn test, and an apparatus for evaluating a burn test, a data processing system, a computer program product, and a computer-readable storage media. The following is a non-exhaustive list of examples, which may or may not be claimed, of the subject matter according to the present disclosure.

In an example, the disclosed method includes steps of: (1) detecting an infrared reflection of a flame on a test piece; (2) capturing initiation of fire damage to the test piece using the infrared reflection; and (3) capturing the fire damage though cessation of the fire damage using the infrared reflection.

In another example, the disclosed method includes steps of: (1) optically monitoring a test piece while subjecting the test piece to a burner-flame; (2) optically monitoring the test piece after removing the test piece from the burner-flame; and (3) determining at least one burn characteristic of the test piece after a piece-flame extinguishes.

In an example, the disclosed system includes an optical sensor system and a computer. The optical sensor system is configured to detect an infrared reflection of a flame on a test piece. The computer programmed to capture initiation of fire damage to the test piece using the infrared reflection. The computer is programmed to capture the fire damage though cessation of the fire damage using the infrared reflection.

In another example, the disclosed system includes an optical sensor system and a computer. The optical sensor system is configured to optically measure at least one flame parameter of a piece-flame that is consuming a test piece during the burn test. The computer is programmed to determine at least one burn characteristic of the test piece after the piece-flame extinguishes based on the least one flame parameter.

In an example, the disclosed apparatus includes at least one optical sensor and a data processing system. The at least one optical sensor detects an infrared reflection of a flame on a test piece. The data processing system is in communication with the at least one optical sensor. The data processing system includes a processor and a memory storing program code that, when executed by the processor, causes the processor to capture initiation of fire damage to the test piece using the infrared reflection. The computer is programmed to capture the fire damage though cessation of the fire damage using the infrared reflection.

In another example, the disclosed apparatus includes at least one optical sensor and a data processing system. The at least one optical sensor measures at least one flame parameter of a piece-flame that is consuming a test piece. The data processing system is in communication with the at least one optical sensor. The data processing system includes a processor and a memory storing program code that, when executed by the processor, causes the processor to determine at least one burn characteristic of the test piece after the piece-flame extinguishes based on the least one flame parameter.

In an example, the disclosed data processing system includes a processor and a memory storing program code that, when executed by the processor, causes the processor to: (1) detect an infrared reflection of a flame on a test piece; (2) capture initiation of fire damage to the test piece using the infrared reflection; and (3) capture the fire damage though cessation of the fire damage using the infrared reflection.

In an example, the disclosed data processing system includes a processor and a memory storing program code that, when executed by the processor, causes the processor to: (1) optically monitor a test piece while subjecting the test piece to a burner-flame; (2) optically monitor the test piece after removing the test piece from the burner-flame; and (3) determine at least one burn characteristic of the test piece after a piece-flame extinguishes.

In an example, the disclosed computer program product includes instructions that, when executed by a computing device, cause the computing device to carry out one or more steps of: (1) (1) detecting an infrared reflection of a flame on a test piece; (2) capturing initiation of fire damage to the test piece using the infrared reflection; and (3) capturing the fire damage though cessation of the fire damage using the infrared reflection.

In an example, the disclosed computer-readable storage media includes instructions that, when executed by a computing device, cause the computing device to carry out one or more steps of: (1) optically monitoring a test piece while subjecting the test piece to a burner-flame; (2) optically monitoring the test piece after removing the test piece from the burner-flame; and (3) determining at least one burn characteristic of the test piece after a piece-flame extinguishes.

Other examples of the method, the system, the apparatus, the data processing system, the computer program product, and the computer-readable storage media disclosed herein will become apparent from the following detailed description, the accompanying drawings, and the appended claims.

DETAILED DESCRIPTION

Figure 1:
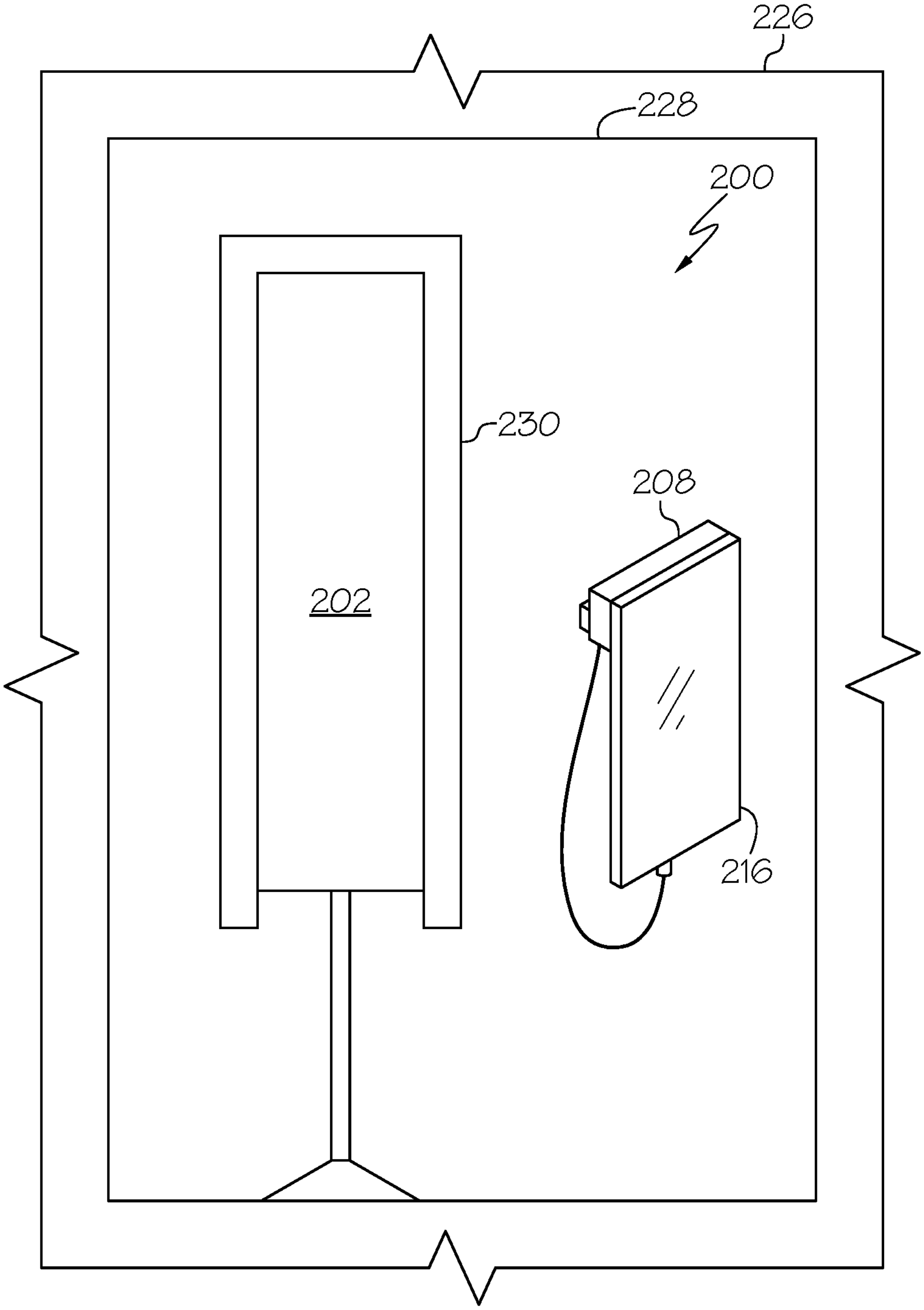
FIG. 1 is a schematic illustration of an example of a system for performing and evaluating a burn test.

Referring generally to FIGS. 1-9, by way of examples, the present disclosure is directed to systems, apparatuses, and methods for performing and evaluating burn tests. Generally, burn tests refer to or otherwise include any suitable testing and/or evaluation techniques and methods for demonstrating compliance with fire resistance and/or flammability requirements of manufactured products and/or the materials used to manufacture the products. In an aerospace example, the burn tests are defined by regulation, such as established by the Federal Aviation Administration (FAA) or the airworthy standards of Title 14 Part 25 of the U.S. Code of Federal Regulations.

The burn test is performed on a test piece. In one or more examples, the test piece is a specimen removed from the product being tested or a specimen made of the same material and manufactured by the same process as the product being tested. Any number of (e.g., three) test pieces representing the product can be tested during a given testing and evaluation process, depending, for example, on the size of the test piece, the thickness of the test piece, the material being tested, the end-use application of the material and/or product being tested, and the like.

The present disclosure recognizes that conventional techniques for evaluating burn tests require manual measurements and data entry of any evaluation criteria, which are subjective, labor intensive, and prone to error. According to the systems, apparatuses, and methods described herein, the disclosed testing and evaluation processes provide various improvements over conventional burn testing procedures. As will be described in more detail herein, the testing and evaluation process includes one or more of the following operations: (1) pre-screening a test piece; (2) conditioning the test piece in preparation for burn testing; (3) determining one or more measurements (e.g., base or pre-test measurements) of one or more evaluation criteria for the test piece before the burn test; (4) subjecting the test piece to the burn test; (5) monitoring and determining one or more measurements (e.g., intra-test measurements) of one or more evaluation criteria for the test piece during the burn test; (6) determining one or more measurements (e.g., post-test measurements) of one or more evaluation criteria for the test piece after the burn test; (7) evaluating the test piece based on the measurements (e.g., pre-test measurements, intra-test measurements, and/or post-test measurements); and (8) recording the measurements (e.g., pre-test measurements, intra-test measurements, and/or post-test measurements). One or more of the preceding operations of the testing and evaluation process is computer implemented or is performed using automated optical sensors and data processing systems that digitally and quantitively measure and evaluate the associated evaluation criteria for the test piece. Therefore, the systems, apparatuses, and methods described herein enable measurement and evaluation of criteria that are difficult or impossible to accurately measure, record, and evaluate using conventional, manual techniques.

In various examples, the burn test can be performed according to any one of a number of different testing methodologies and parameters, such as duration of active burning, orientation of the test piece, and the like. The evaluation operations described herein are applicable to any suitable testing methodologies and parameters and, therefore, are not limited to any one of the examples illustrated and described herein.

Referring now to FIGS. 1-6, which schematically illustrate examples of a testing environment 226 in which a system 200 is used to perform a burn test a test piece 202 and evaluate the results of the burn test. In various examples, the system 200 includes a number of operational or function components, including one or more of an optical sensor system 208, a computer 216, a holder 230, and an enclosure 228. In one or more examples, the burn test is performed in the enclosure 228, such as a cabinet. The enclosure 228 reduces or eliminates the effect of air drafts on the burn test. In one or more examples, the test piece 202 is held by the holder 230, such as a fixture. The holder 230 can hold the test piece 202 in a vertical orientation (e.g., as illustrated in FIG. 15), a horizontal orientation (not shown), or at angle, such as a 45-degree angle (not shown).

Referring to FIG. 1, the test piece 202 is secured to the holder 230 in a desired orientation within the enclosure 228. In one or more examples, the test piece 202 is pre-screened and/or conditioned. Pre-screening ensures that no material defects exist in the test piece 202 that may affect the results of the test. Conditioning prepares the test piece 202 for burn testing.

Figure 6:
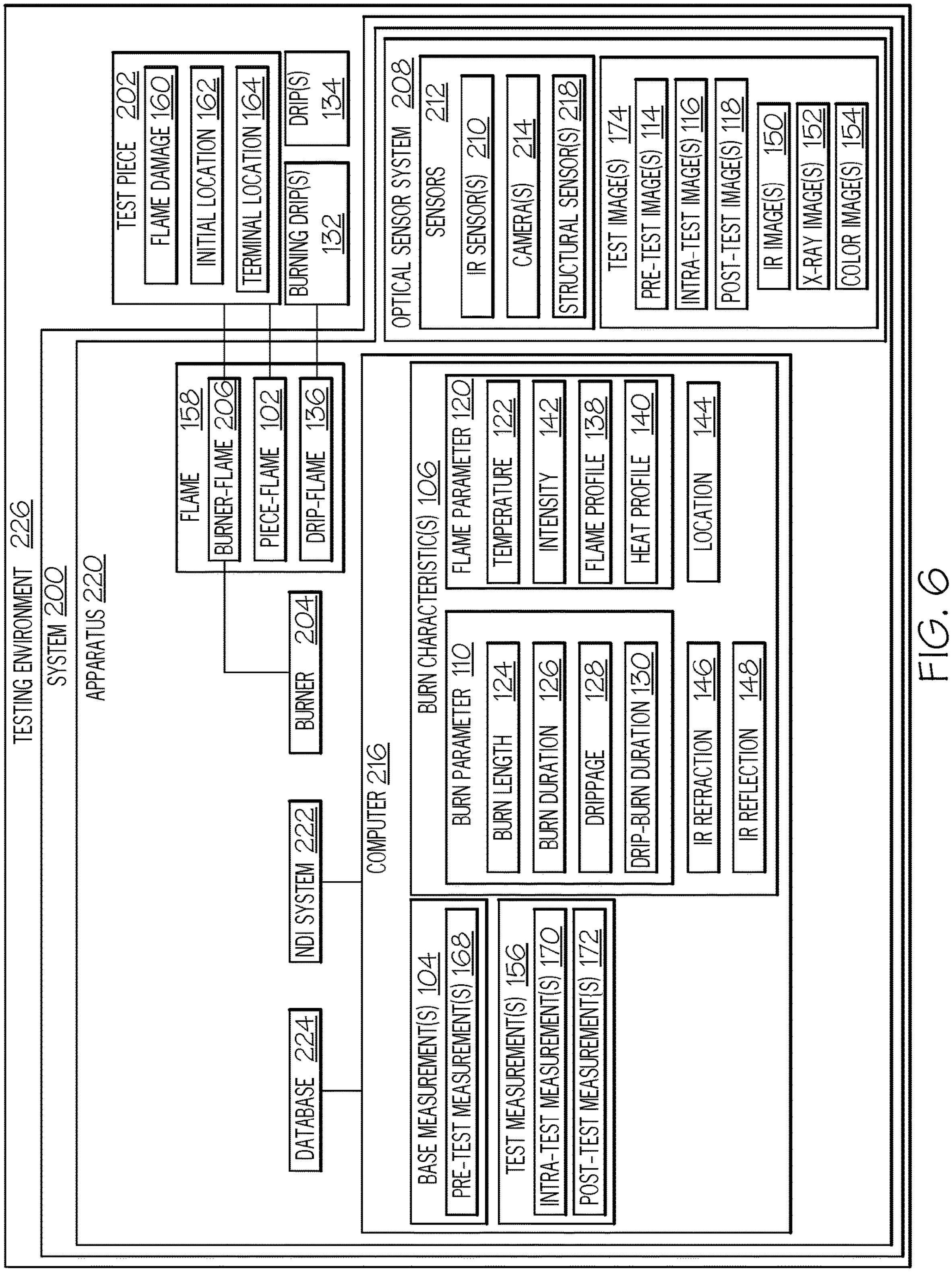
FIG. 6 is a schematic block diagram of an example of the system.

Referring to FIG. 6, in one or more examples, one or more base measurements 104 are taken of the test piece 202 before the burn test. The base measurements 104 are taken or generated using the optical sensor system 208 and the computer 216. The base measurements 104, which may also be referred to as pre-test measurements 168, refer to or include baseline measurements or quantitative values of one or more burn characteristics 106 to be evaluated before testing occurs. The burn characteristics 106 refer to or include the evaluation criteria used to determine compliance of the test piece 202.

Figure 2:
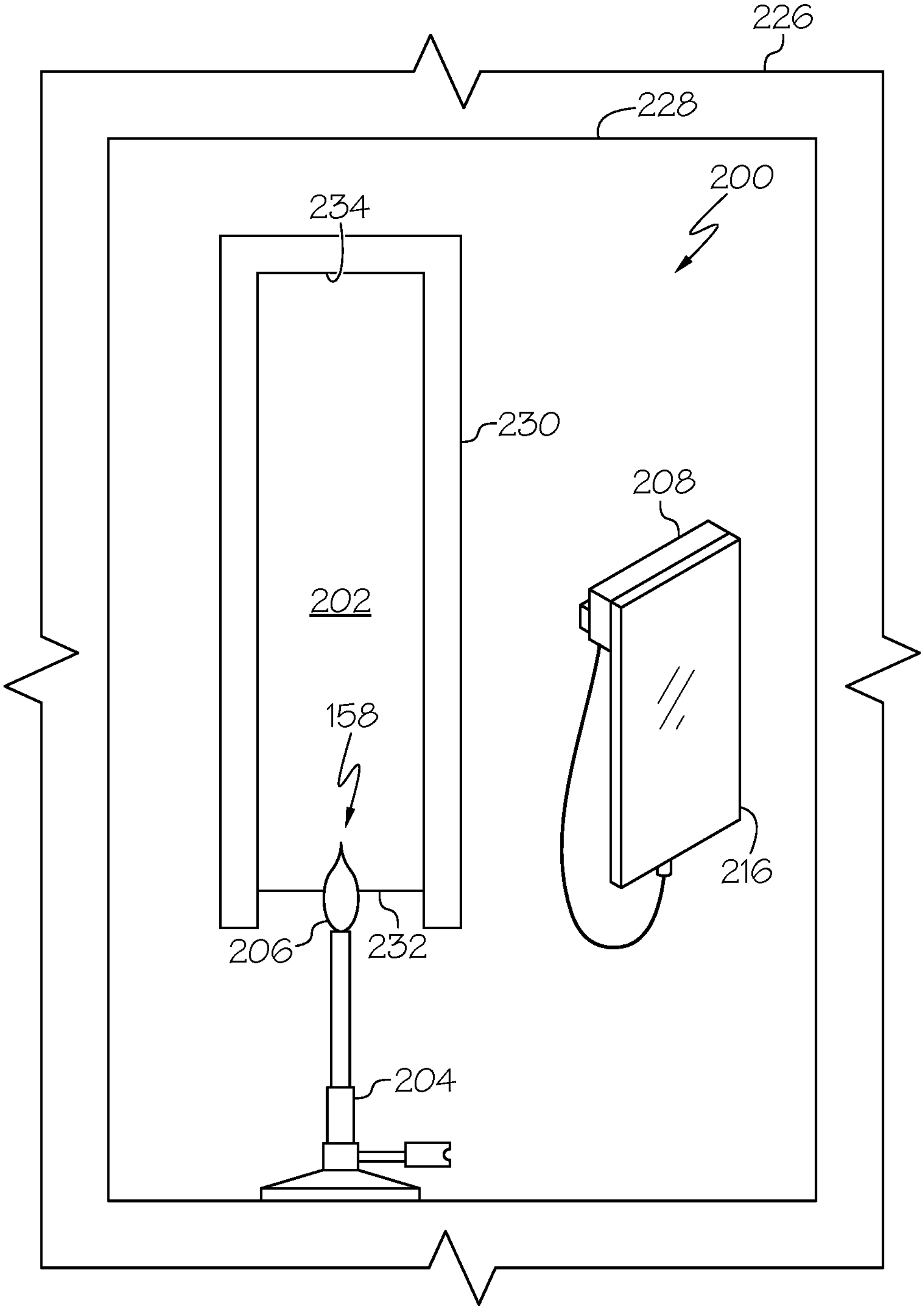
FIG. 2 is a schematic illustration of an example of the system.

Referring to FIG. 2, in one or more examples, the test piece 202 is subjected to a flame 158. In one or more examples, the flame 158 is a generated by a burner 204 or other ignition source, such as a Bunsen burner or other suitable gas burner. In one or more examples, the flame 158, while being generated by the burner 204, is referred to as a burner-flame 206. In one or more examples, the burner-flame 206 is positioned (e.g., according to testing specifications) relative to a first end 232 of the test piece 202. The test piece 202 is subjected to the burner-flame 206 for an ignition time (e.g., according to testing specifications). For the purpose of the present disclosure, the ignition time is the duration or length of time (e.g., in seconds) that the burner-flame 206 is applied to the test piece 202. Examples, of the ignition time are 60 seconds, 30 seconds, 15 seconds, and 12 seconds.

Referring again to FIG. 6, in one or more examples, one or more test measurements 156 are taken of the test piece 202 during the ignition time of the burn test. The test measurements 156 are taken or generated using the optical sensor system 208 and the computer 216. The test measurements 156, which may also be referred to as intra-test measurements 170, refer to or include measurements or quantitative values of one or more of the burn characteristics 106 to be evaluated while the burner-flame 206 is applied to the test piece 202.

Figure 3:
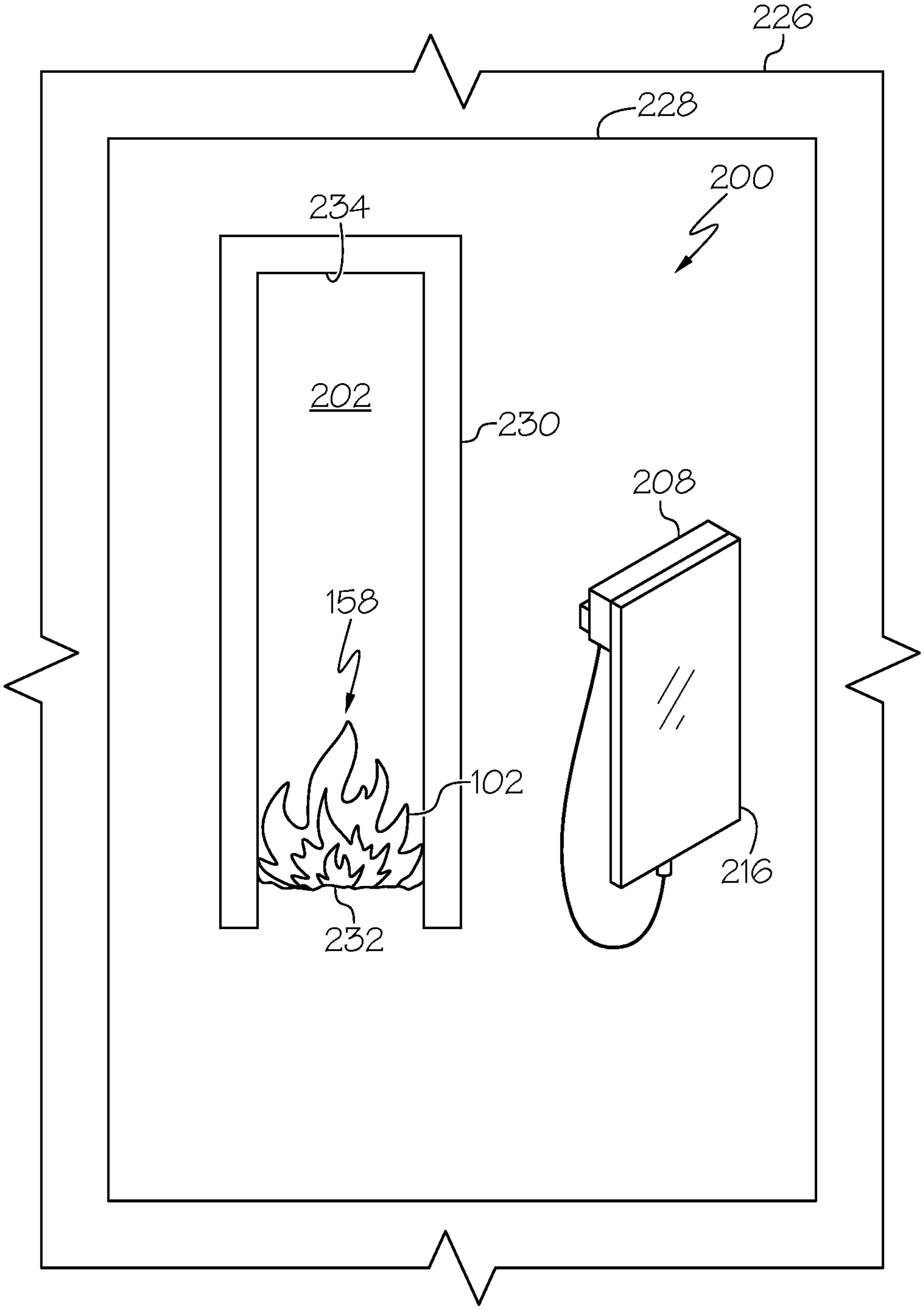
FIG. 3 is a schematic illustration of an example of the system.
Figure 4:
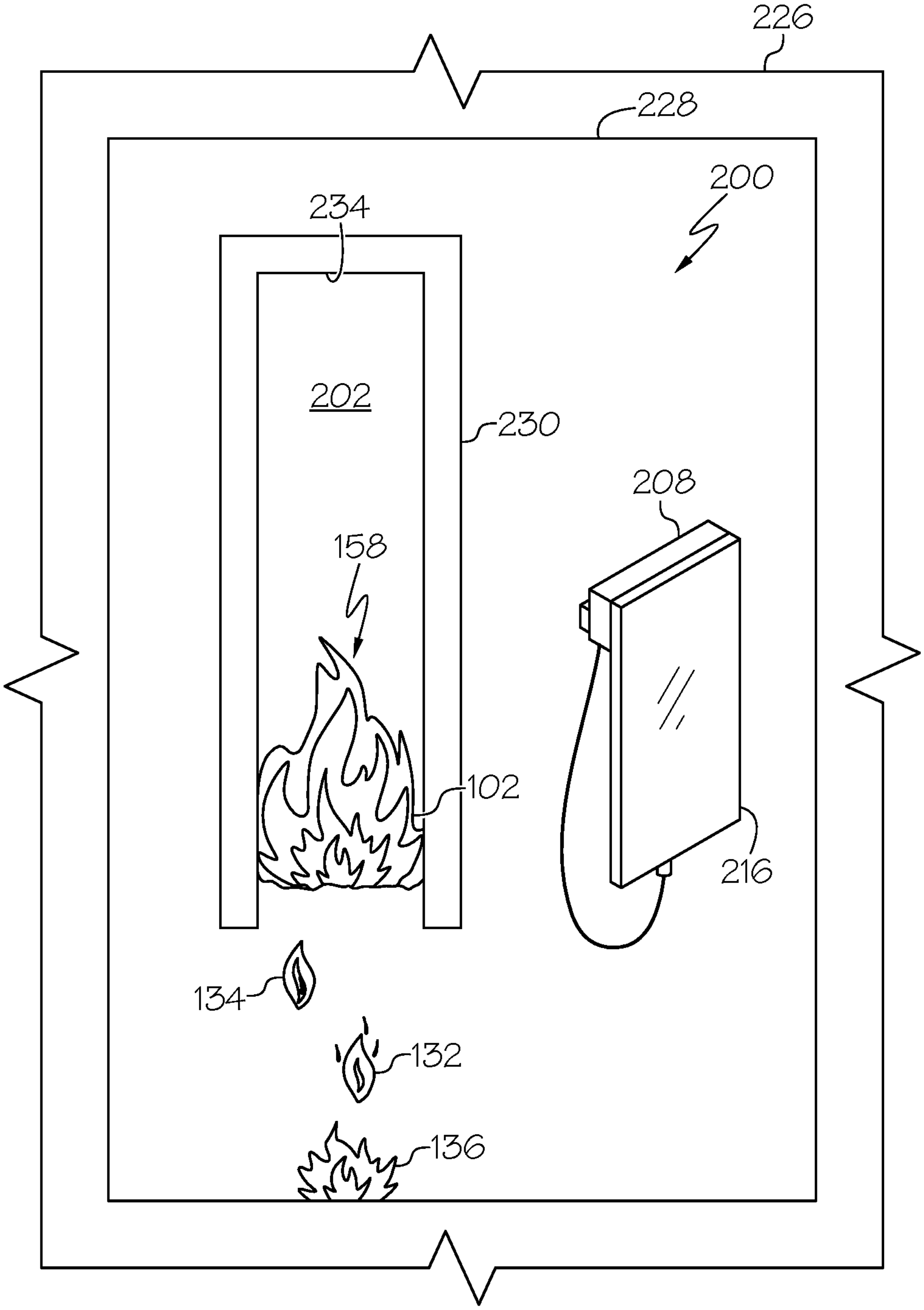
FIG. 4 is a schematic illustration of an example of the system.

Referring to FIGS. 3 and 4, in one or more examples, at an end of the ignition time, the burner-flame 206 (FIG. 2) is removed from the test piece 202. In one or more examples, the flame 158 is a flame that is actively consuming the test piece 202 after removal of the burner 204 (FIG. 2). In one or more examples, the flame 158 consuming the test piece 202 after removal of the burner 204 is referred to as a piece-flame 102. During the burn test, the piece-flame 102 consumes the test piece 202 from the first end 232 toward the second end 234. It can be appreciated that during a portion of the ignition time of the burn test, the flame 158 may include or refer to both or a combination of the burner-flame 206 and the piece-flame 102. The piece-flame 102 continues to consume the test piece 202 for an extinguishing time. For the purpose of the present disclosure, the extinguishing time refers to the duration or total time (e.g., in seconds) that the test piece 202 continues to burn with the flame 158 (e.g., piece-flame 102) after removal of the ignition source (e.g., the burner 204).

Referring again to FIG. 6, in one or more examples, one or more test measurements 156 are taken of the test piece 202 during the extinguishing time of the burn test (e.g., after the ignition time of the burn test and while the piece-flame 102 is consuming the test piece 202). The test measurements 156 are taken or generated using the optical sensor system 208 and the computer 216. The test measurements 156, which may also be referred to as the intra-test measurements 170, refer to or include measurements or quantitative values of one or more of the burn characteristics 106 to be evaluated during the extinguishing time (e.g., after the burner-flame 206 is removed from the test piece 202 and while the piece-flame 102 is actively consuming the test piece 202).

Figure 5:
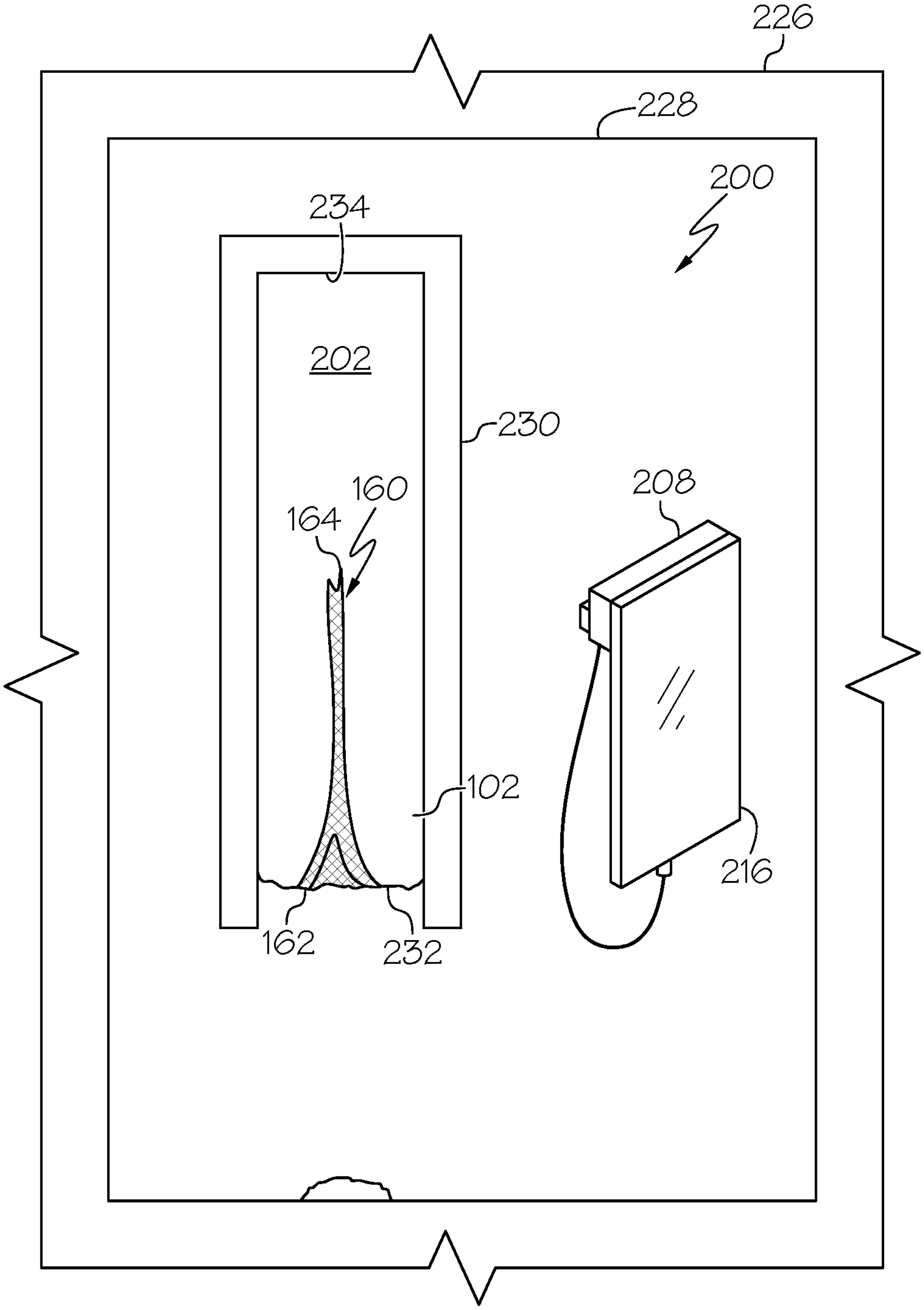
FIG. 5 is a schematic illustration of an example of the system.

Referring to FIG. 5, in one or more examples, at an end of the extinguishing time, the piece-flame 102 (FIGS. 3 and 4) is extinguished and has stopped consuming the test piece 202. In one or more examples, the test piece 202 includes fire damage 160. The fire damage 160 refers to or includes any material damage due to combustion and/or flame consumption of a surface, an area, or a region of the test piece 202. In one or more examples, the fire damage 160 also includes or refers to areas of partial consumption, charring, or embrittlement. In one or more examples, the fire damage 160 does not include areas sooted, stained, warped, or discolored, nor areas where material has shrunk or melted away due to heat. The fire damage 160 may also be referred to as burn damage.

Referring again to FIG. 6, in one or more examples, one or more test measurements 156 are taken of the test piece 202 after the extinguishing time of the burn test (e.g., after the piece-flame 102 has self-extinguished). The test measurements 156 are taken or generated using the optical sensor system 208 and the computer 216. The test measurements 156, which may also be referred to as post-test measurements 172, refer to or include measurements or quantitative values of one or more of the burn characteristics 106 to be evaluated after the extinguishing time (e.g., after the piece-flame 102 is no longer consuming the test piece 202).

Accordingly, the test piece 202 is monitored, measured, and evaluated before, during, and after the burn test to determine burn or flame damage using one or more optical measurements taken by the optical sensor system 208 and the computer 216. In one or more examples, the fire damage 160 is measured and/or evaluated based on measurement of the burn characteristics 106. In one or more examples, the burn characteristics 106 are represented by the test measurements 156 and represent the fire damage 160. As will be described in more detail below, examples of the burn characteristics 106 include one or more burn parameters 110 and/or one or more flame parameters 120 measured and recorded during the burn test by the optical sensor system 208 and the computer 216.

Figure 7:
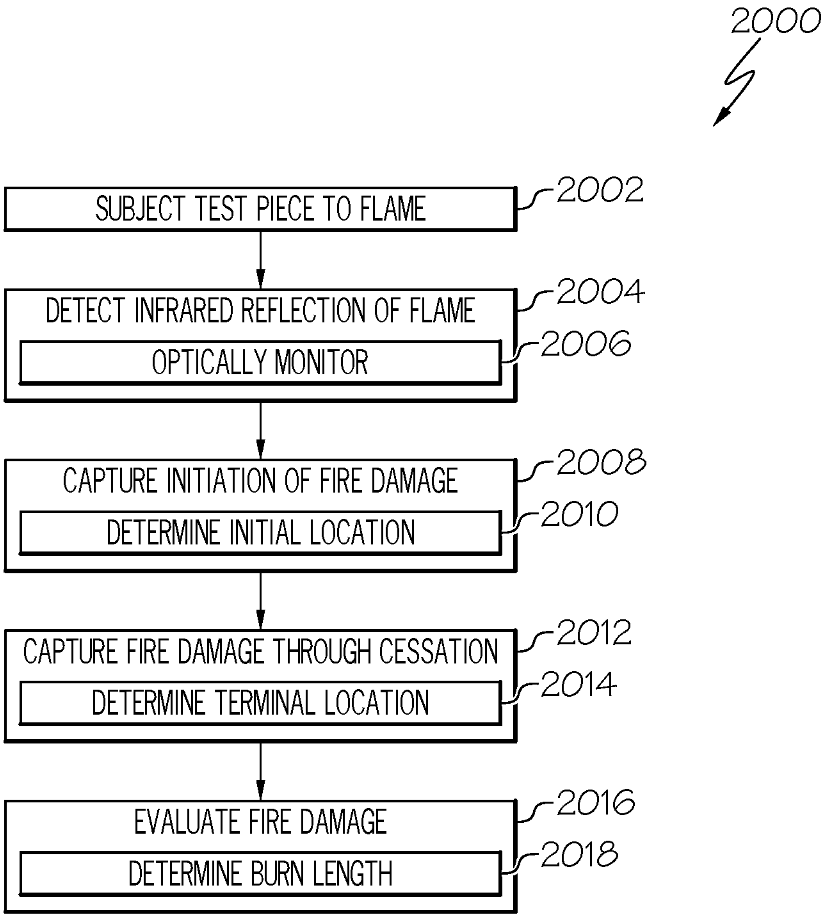
FIG. 7 is a flow diagram of an example of a method for performing and evaluating a burn test.
Figure 9:
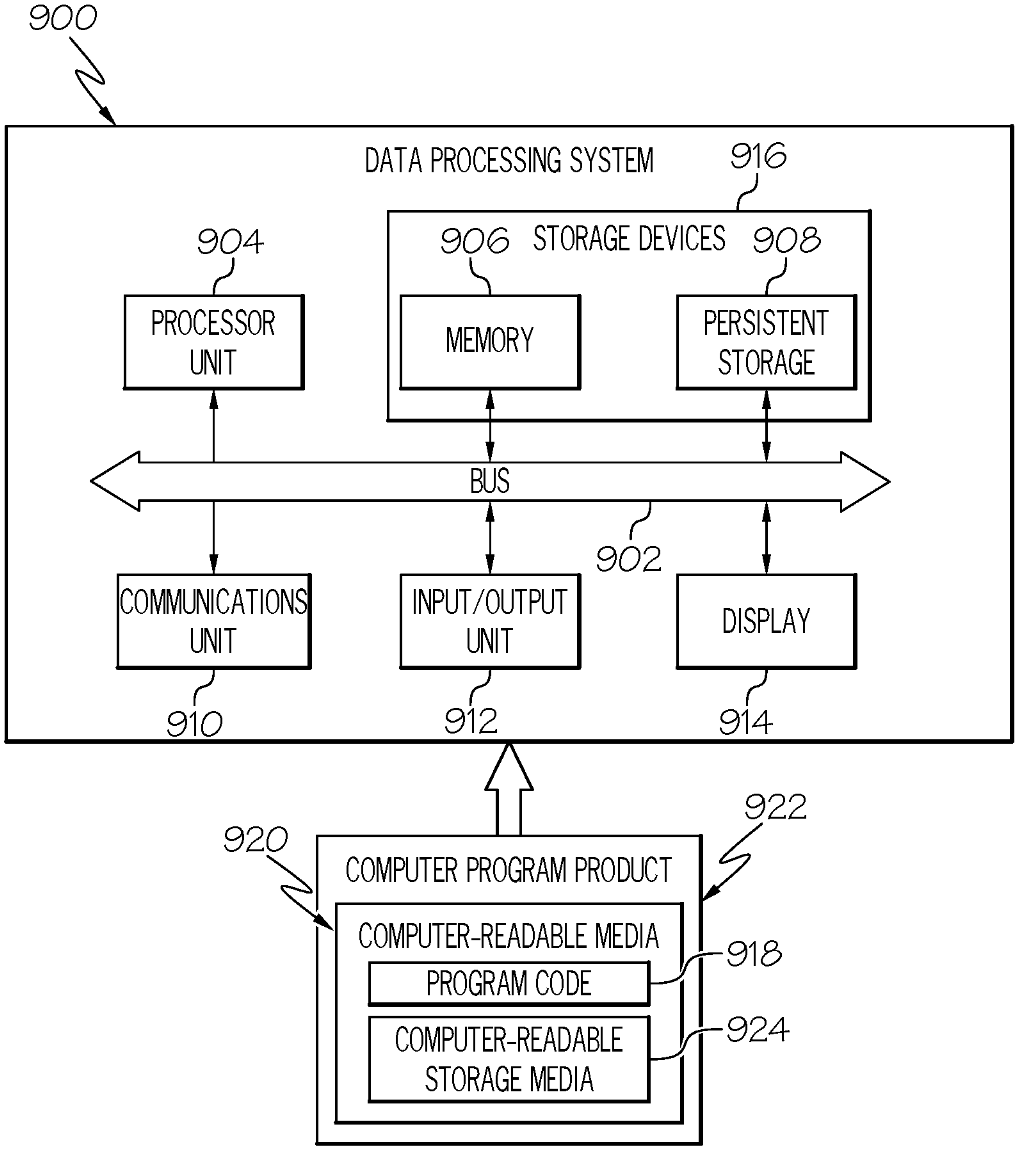
FIG. 9 is a schematic block diagram of an example of the data processing system.

Referring now generally to FIGS. 1-6 and particularly to FIG. 7, which schematically illustrates an example of a method 2000 for evaluating a burn test. In one or more examples, the method 2000 is implemented using the system 200 (FIG. 6), the apparatus 220 (FIG. 6), and/or the data processing system 900 (FIG. 9). In one or more examples, one or more operations or steps of the method 2000 are performed using a computer and, as such, in these examples, the method 2000 is a computer-implemented method or includes one or more computer-implemented processes. The following are examples of the method 2000, according to the present disclosure. Not all of the elements, steps, and/or operations described in one example are required in that example. Some or all of the elements, steps, and/or operations described in one example can be combined with other examples in various ways without the need to include other elements, steps, and/or operations described in those other examples, even though such combination or combinations are not explicitly described or illustrated by example herein.

In one or more examples, the method 2000 includes a step of (block 2002) subjecting the test piece 202 to the flame 158. As an example, the flame 158 is the burner-flame 206 applied to the first end 232 of the test piece 202 by the burner 204 or other ignition source, such as during the ignition time. As another example, the flame 158 is a combination of the burner-flame 206 and the piece-flame 102 that is consuming the test piece 202, such as near an end of the ignition time. As another example, the flame 158 is the piece-flame 102 that consumes the test piece 202, such as after the ignition time.

In one or more examples, the method 2000 includes a step of (block 2004) detecting an infrared reflection 148 of the flame 158 on the test piece 202. In these examples, the infrared reflection 148 is an example of the flame parameter 120 that is measured by the optical sensor system 208 and the computer 216 and used to determine and/or evaluate the fire damage 160 and/or the burn characteristics 106 of the test piece 202.

In one or more examples, according to the method 2000, the step of (block 2004) detecting the infrared reflection 148 of the flame 158 on the test piece 202 includes a step of (block 2006) optically monitoring the test piece 202 using at least one optical sensor 212.

In one or more examples, the method 2000 includes a step of (block 2008) capturing initiation of the fire damage 160 to the test piece 202 using the infrared reflection 148. As an example, initiation of the fire damage 160 includes commencement of consumption or active burning of the test piece 202 by the flame 158 (e.g., a start of the extinguishing time) and an initial location 162 on the test piece 202 where the fire damage 160 begins, such as at or along the first end 232 or first edge of the test piece 202. In one or more examples, according to the method 2000, the step of (block 2008) capturing the initiation of the fire damage 160 includes a step of (block 2010) determining the initial location 162 of the fire damage 160 on the test piece 202. In these examples, the infrared reflection 148 captured and recorded by the optical sensor system 208 provides a measurable flame parameter that can interpreted and analyzed by the computer 216 to determine the initiation of the fire damage 160.

In one or more examples, the method 2000 includes a step of (block 2012) capturing the fire damage 160 though cessation of the fire damage 160 using the infrared reflection 148. As an example, cessation of the fire damage 160 includes termination of the consumption or active burning of the test piece 202 by the flame 158 (e.g., an end of the extinguishing time) and a terminal location 164 on the test piece 202 where the fire damage 160 ends, such as at a location between the first end 232 (or first edge) and the second end 234 (or second edge) of the test piece 202. In one or more examples, according to the method 2000, the step of (block 2012) capturing the fire damage 160 includes a step of (block 2014) determining a terminal location 164 of the fire damage 160 on the test piece 202 after the flame 158 extinguishes. In these examples, the infrared reflection 148 captured and recorded by the optical sensor system 208 provides a measurable flame parameter that can interpreted and analyzed by the computer 216 to determine the cessation of the fire damage 160.

In one or more examples, the method 2000 includes a step of (block 2016) evaluating the fire damage 160. In one or more examples, according to the method 2000, the step of (block 2016) evaluating the fire damage 160 includes a step of (block 2018) determining a burn length 124 of the fire damage 160 between the initial location 162 and the terminal location 164. For the purpose of the present disclosure, the burn length 124 refers to the distance from initiation of the fire damage 160, such as the initial location 162 or the edge of the first end 232, to the farthest point showing evidence of damage due to that area's combustion, such as the terminal location 164 between the edge of the first end 232 and the edge of the second end 234. In one or more examples, the method 2000 advantageously enables real-time monitoring and recording of the flame 158 and the fire damage 160 resulting from the flame 158 during the burn test. The test measurements 156, captured, measured, and recorded by the optical sensor system 208 and the computer 216 provide quantitative evaluation of the fire damage 160.

In other examples, as further described herein below, the step of (block 2016) evaluating the fire damage 160 can include steps of determining one or more other burn characteristics 106, such as, but not limited to, a burn duration 126, drippage 128, drip-burn duration 130, other suitable measurable parameters or characteristics, and combinations thereof.

Figure 8:
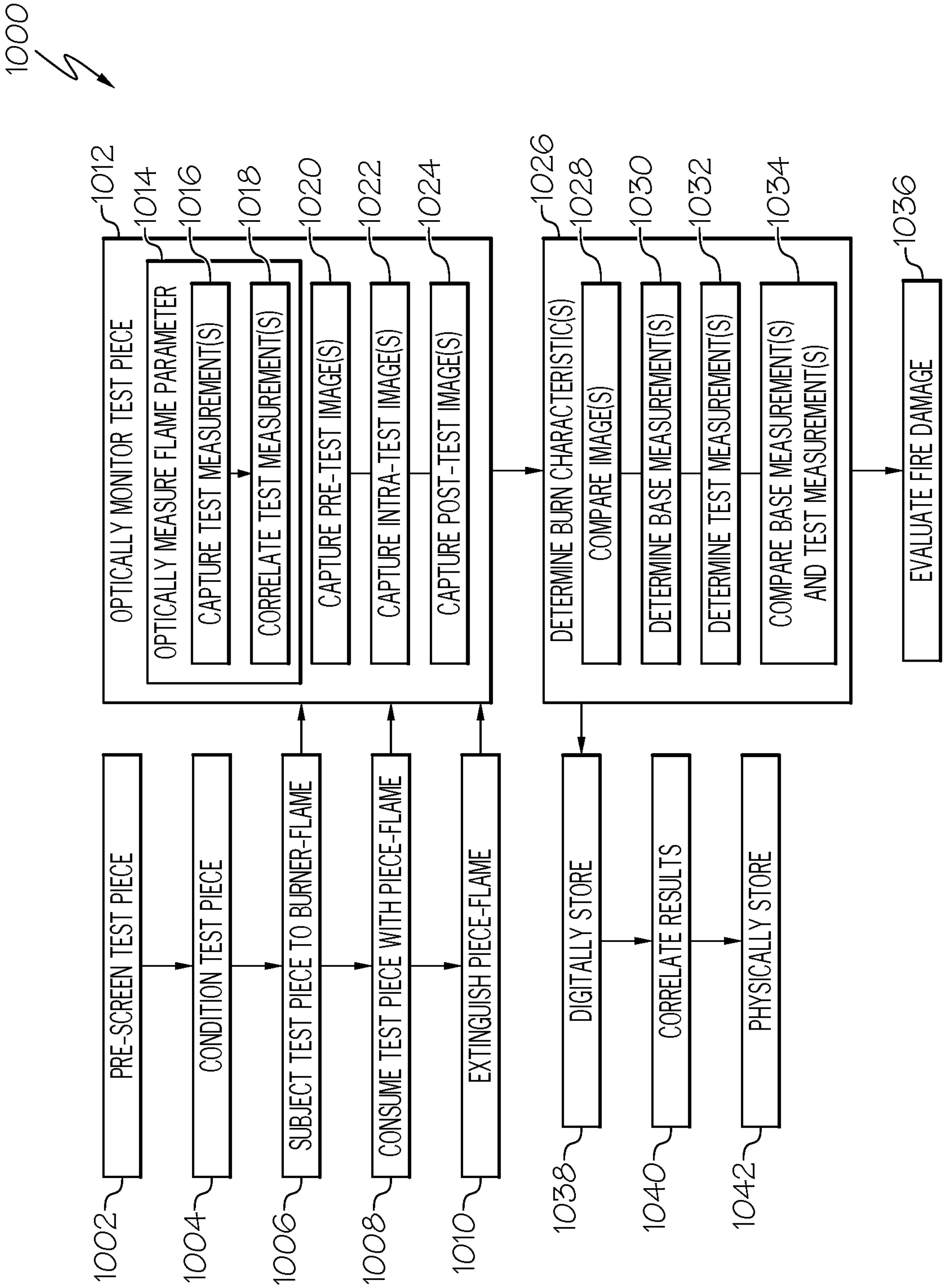
FIG. 8 is a flow diagram of an example of the method.

Referring now generally to FIGS. 1-6 and particularly to FIG. 8, which schematically illustrates an example of a method 1000 for evaluating a burn test. In one or more examples, the method 1000 is implemented using the system 200 (FIG. 6), the apparatus 220 (FIG. 6), and/or the data processing system 900 (FIG. 9). In one or more examples, the method 1000 is an example implementation of the method 2000 (FIG. 7). In one or more examples, one or more operations or steps of the method 1000 are performed using a computer and, as such, in these examples, the method 1000 is a computer-implemented method or includes one or more computer-implemented processes. The following are examples of the method 1000, according to the present disclosure. Not all of the elements, steps, and/or operations described in one example are required in that example. Some or all of the elements, steps, and/or operations described in one example can be combined with other examples in various ways without the need to include other elements, steps, and/or operations described in those other examples, even though such combination or combinations are not explicitly described or illustrated by example herein.

In one or more examples, the method 1000 includes a step of (block 1002) pre-screening the test piece 202. The step of (block 1002) pre-screening the test piece 202 is performed before subjecting the test piece 202 to the burner-flame 206 (e.g., block 1006). The step of (block 1002) pre-screening the test piece 202 is performed before optically monitoring the test piece 202 (e.g., block 1012). In one or more examples, according to the method 1000, the step of (block 1002) pre-screening includes a step of non-destructively testing the test piece 202 using any suitable non-destructive testing or inspection technique and/or equipment, such as ultrasound testing. X-ray testing, thermal testing, infrared testing, and the like.

In one or more examples, the method 1000 includes a step of (block 1004) conditioning the test piece 202. The step of (block 1004) conditioning the test piece 202 is performed before subjecting the test piece 202 to the burner-flame 206 (e.g., block 1006). The step of (block 1004) conditioning the test piece 202 is performed before optically monitoring the test piece 202 (e.g., block 1012). The conditioning step (e.g., block 1004) is performed to prepare the test piece 202 for the burn test.

In one or more examples, according to the method 1000, the step of (block 1004) conditioning includes a step of controlling at least one of a humidity and/or a temperature of the test piece 202 for a predetermine time period. As an example, the test piece 202 is conditioned at a temperature of between approximately 65° F. (18° C.) and approximately 75° F. (24° C.) and at a relative humidity of between approximately 45% for at least 24 hours.

In one or more examples, the method 1000 includes a step of (block 1006) subjecting the test piece 202 to the burner-flame 206. The method 1000 includes a step of (block 1008) removing the burner-flame 206 and consuming the test piece 202 with the piece-flame 102. The piece-flame 102 results from combustion of the test piece 202 in response to application of the burner-flame 206. The method 1000 also includes a step of (block 1010) extinguishing the piece-flame 102. The step of (block 1010) extinguishing the piece-flame 102 is not an actively performed step, rather the extinguishing step (e.g., block 1010) occurs naturally as the piece-flame 102 self-extinguishes. Generally, the burning steps (e.g., blocks 1006, 1008, and 1010) represent the burn testing operation. The remaining steps of the method 1000 describe the measuring and evaluating steps of the burn test.

In an example, the burner-flame 206 is the flame 158 applied to the first end 232 of the test piece 202 by the burner 204 or other ignition source, such as during the ignition time. In another example, a combination of the burner-flame 206 and the piece-flame 102 that consumes the test piece 202, such as near an end of the ignition time, is the flame 158. In another example, the piece-flame 102 that consumes the test piece 202, such as after the ignition time, is the flame 158.

In one or more examples, the method 1000 includes a step of (block 1012) optically monitoring the test piece 202. In one or more examples, the step of (block 1012) optically monitoring is performed while subjecting the test piece 202 to the burner-flame 206 (e.g., block 1006). For example, the test piece 202 is optically monitored during the ignition time. In these examples, the burner-flame 206 is optically monitored during the ignition time using the optical sensor system 208 and the computer 216. In situations where the test piece 202 begins to burn during the ignition time, the burner-flame 206 and the piece-flame 102 are optically monitored during the using the optical sensor system 208 and the computer 216. In one or more examples, the step of (block 1012) optically monitoring the test piece 202 is an example of the detecting step (e.g., block 2004) of the method 2000 (FIG. 7). The burner-flame 206 and/or the piece-flame 102 are examples of the flame 158.

In one or more examples, according to the method 1000, the step of (block 1012) optically monitoring (e.g., continuing to optically monitor in real-time) the test piece 202 is performed after removing the test piece 202 from the burner-flame 206 (e.g., block 1008). For example, the test piece 202 is optically monitored during the extinguishing time. In these examples, the piece-flame 102 is optically monitored during the extinguishing time using the optical sensor system 208 and the computer 216. In one or more examples, the step of (block 1012) optically monitoring is an example of the detecting step (e.g., block 2004) of the method 2000 (FIG. 7).

In one or more examples, according to the method 1000, the step of (block 1012) optically monitoring (e.g., continuing to optically monitor in real-time) the test piece 202 is performed after extinguishing of the piece-flame 102 (e.g., block 1010). For example, the test piece 202 is optically monitored after the extinguishing time. In these examples, the test piece 202 is optically monitored after the extinguishing time using the optical sensor system 208 and the computer 216. In one or more examples, the step of (block 1012) optically monitoring is an example of the detecting step (e.g., block 2004) of the method 2000 (FIG. 7).

In one or more examples, the method 1000 includes a step of (block 1026) determining at least one burn characteristic 106 of the test piece 202 after the piece-flame 102 extinguishes. The step of (block 1026) determining at least one burn characteristic 106 is an example of the capturing steps (e.g., block 2008 and/or block 2012) of the method 2000 (FIG. 7). The fire damage 160 is an example of the at least one burn characteristic 106. The initial location 162 of the fire damage 160 is an example of the at least one burn characteristic 106. The terminal location 164 of the fire damage 160 is an example of the at least one burn characteristic 106. The burn length 124 of the fire damage 160 is an example of the at least one burn characteristic 106.

In one or more examples, according to the method 1000, the step of (block 1026) determining the at least one burn characteristic 106 of the test piece 202 is performed after removing the test piece 202 from the burner-flame 206 (e.g., block 1008) and before extinguishing of the piece-flame 102 (e.g., block 1010). In one or more examples, according to the method 1000, the step of (block 1026) determining the at least one burn characteristic 106 of the test piece 202 is performed after extinguishing of the piece-flame 102 (e.g., block 1010).

In one or more examples, according to the method 1000, the at least one burn characteristic 106 includes the burn length 124. In one or more examples, the burn characteristic 106 is evaluated as a function of location 144 on the test piece 202. As an example, the burn characteristic 106 includes the burn length 124 as a function of location 144 on the test piece 202. In these examples, the computer 216 is programmed to calculate the burn length 124 from the test measurements 156 captured by the optical sensor system 208.

In one or more examples, the computer 216 is programmed with a measurement application and/or an image processing application that enable coordinate-based measurements and/or pixel-based measurements using the test measurements 156, such as one or more images of the test piece 202, captured by the optical sensor system 208 and processed by the computer 216. In one or more examples, the burn length 124 is determined based on a predetermined coordinate system of the testing environment 226 that is fixed relative to the test piece 202 such that the computer 216 can measure the distance of the fire damage 160 based on recorded coordinates of flame measurements or pixels in captured images of the test piece 202 during and after the burn test.

In one or more examples, according to the method 1000, the at least one burn characteristic 106 includes at least one flame parameter 120 of the piece-flame 102. In these examples, the computer 216 is programmed to calculate the flame parameter 120 from the test measurements 156 captured by the optical sensor system 208.

In one or more examples, according to the method 1000, the flame parameter 120 of the flame 158 (e.g., the piece-flame 102) includes a flame profile 138 of the flame 158 (e.g., the piece-flame 102). The flame profile 138 refers to a flame shape of the flame 158, such as flaming action and moving of fire on the test piece 202, for example, as shown in images of the area, that displays combustion, charring, and/or embrittlement.

In one or more examples, according to the method 1000, the flame parameter 120 of the flame 158 (e.g., the piece-flame 102) includes a heat profile 140 of the flame 158 (e.g., the piece-flame 102). The heat profile 140 refers to how hot an area on fire is, for example, as displayed through thermal monitoring using the optical sensor system 208 and the computer 216.

In one or more examples, according to the method 1000, the flame parameter 120 of the flame 158 (e.g., the piece-flame 102) includes a heat intensity 142 of the flame 158 (e.g., the piece-flame 102). The heat intensity 142 refers to a measure of the distribution of radiant heat flux per unit area and solid angle, in a particular direction.

In one or more examples, according to the method 1000, the flame parameter 120 of the flame 158 (e.g., the piece-flame 102) includes a temperature 122 of the flame 158 (e.g., the piece-flame 102).

In one or more examples, according to the method 1000, the at least one flame parameter 120 of the piece-flame 102 includes at least one of or a combination of the flame profile 138, the heat profile 140, the heat intensity 142, and/or the temperature 122 of the piece-flame 102.

In one or more examples, the flame parameter 120 is a function of location 144 on the test piece 202. In these examples, the computer 216 is programmed to calculate the flame parameter 120 from the test measurements 156 captured by the optical sensor system 208. In one or more examples, the at least one flame parameter 120 of the piece-flame 102 includes at least one of or a combination of the flame profile 138, the heat profile 140, the heat intensity 142, and/or the temperature 122 of the piece-flame 102 a function of location 144 on the test piece 202.

In one or more examples, according to the method 1000, the at least one burn characteristic 106 includes a burn duration 126. In one or more examples, the burn duration 126 is a length of time between removing the test piece 202 from the burner-flame 206 and extinguishing of the piece-flame 102. In other words, the burn duration 126 refers to the total time (e.g., in seconds) that the test piece 202 continues to burn with the flame 158 (e.g., piece-flame 102) after removal of the ignition source (e.g., the burner-flame 206). For example, the burn duration 126 is a measurement of the extinguishing time. In one or more examples, the burn duration 126 is determined based on the at least one flame parameter 120 measured and recorded by the optical sensor system 208 and the computer 216.

In one or more examples, according to the method 1000, the at least one burn characteristic 106 includes drippage 128. Drippage 128 refers to one or more drips 134 (FIG. 4) of material that fall from the test piece 202 during the flame, whether the drips 134 are on fire, and, if so, how long the drips 134 continue to burn after falling from the test piece 202. In one or more examples, the optical sensor system 208 and the computer 216 capture and record the number or instances of drips 134 that fall from the test piece 202 and how long into the extinguishing time that the drip 134 forms.

In one or more examples, according to the method 1000, the at least one burn characteristic 106 includes a drip-burn duration 130 between formation of a burning drip 132 and extinguishing of a drip-flame 136. The burning drip 132 is an instance of the drip 134 in which the drip 134 is on fire after falling from the test piece 202. The drip-flame 136 refers to the flame that is consuming the burning drip 132. The drip-burn duration 130 refers to a length of time between the burning drip 132 falling from the test piece 202 and extinguishing of the drip-flame 136. In other words, the drip-burn duration 130 refers to the total time (e.g., in seconds) that the burning drip 132 continues to burn with the drip-flame 136 after falling from the test piece 202. For example, the drip-burn duration 130 is a measurement of the extinguishing time of the burning drip 132. In one or more examples, the drip-burn duration 130 is determined based on the at least one flame parameter 120 of the drip-flame 136 measured and recorded by the optical sensor system 208 and the computer 216. In the event that multiple drips fuel a flame, then the longest continuous drip-flame 136 is recorded.

In one or more examples, the burn length 124, the burn duration 126, drippage 128, drip-burn duration 130, and other like parameters are examples of the burn parameters 110 that are determined based on one or more of the flame parameters 120 that measured and recorded by the optical sensor system 208 and the computer 216 and that are used to evaluate the fire damage 160 to the test piece 202.

In one or more examples, the method 1000 includes a step of (block 1014) optically measuring at least one flame parameter 120 of the flame 158 (e.g., the piece-flame 102). In one or more examples, the step of (block 1012) optically monitoring includes the step of (block 1014) optically measuring. In one or more examples, the step of (block 1014) optically measuring is performed concurrently with or is the result of the optical monitoring step (e.g., block 1012). In one or more examples, the step of (block 1014) optically measuring includes or results in capturing the test measurements 156.

In one or more examples, the step of (block 1014) optically measuring includes a step of (block 1016) capturing the test measurements 156 before burn testing (e.g., pre-test measurements 168), during burn testing (e.g., intra-test measurements 170), and after burn testing (e.g., post-test measurements 172). In one or more examples, the step of (block 1014) optically measuring includes a step of (block 1018) correlating the test measurements 156. As examples, the test measurements 156 are correlated with time intervals, locations on the test piece, the test piece itself (e.g., an identification number associated with the test piece), and the like.

In one or more examples, according to the method 1000, the step of (block 1014) optically measuring the at least one flame parameter 120 of the flame 158 (e.g., the piece-flame 102) includes a step of measuring the infrared reflection 148 of the piece-flame 102. In these examples, the infrared reflection 148 is an example of the test measurements 156. The infrared reflection 148 refers to the focal length, wavelength, speed, direction, and other parameters of infrared light passing through the flame 158, such as reflected from a surface of the test piece 202 through the flame 158.

In one or more examples, according to the method 1000, the step of (block 1014) optically measuring the at least one flame parameter 120 of the flame 158 (e.g., the piece-flame 102) includes a step of measuring an infrared refraction 146 of the flame 158 (e.g., the piece-flame 102). In these examples, the infrared refraction 146 is an example of the test measurements 156. The infrared refraction 146 refers to changes in the focal length, wavelength, speed, direction, and other parameters of infrared light passing through the flame 158, such as reflected from a surface of the test piece 202 through the flame 158.

In one or more examples, according to the method 1000, the step of (block 1014) optically measuring the at least one flame parameter 120 of the flame 158 (e.g., the piece-flame 102) includes the step of measuring the infrared reflection 148, the step of measuring the infrared refraction 146 of the flame 158 (e.g., the piece-flame 102), and a step of comparing the measurements.

In one or more examples, according to the method 1000, the step of (block 1012) optically monitoring the test piece 202 and/or the step of (block 1014) optically measuring the at least one flame parameter 120 of the flame 158 (e.g., the piece-flame 102) is performed using an infrared sensor 210, also referred to herein as IR sensor.

In one or more examples, according to the method 1000, the step of (block 1012) optically monitoring the test piece 202 and/or the step of (block 1014) optically measuring the at least one flame parameter 120 of the flame 158 (e.g., the piece-flame 102) is performed using a structural sensor 218.

In one or more examples, the method 1000, such as the step of (block 1012) optically monitoring, includes a step of (block 1020) capturing at least one pre-test image 114 of the test piece 202. In one or more examples, the step of (block 1020) capturing the pre-test image 114 is performed before subjecting the test piece 202 to the burner-flame 206 (e.g., block 1002). In one or more examples, the pre-test image 114 represents the pre-test measurements 168. In one or more examples, the pre-test measurements 168 are taken from the pre-test image 114.

In one or more examples, the method 1000, such as the step of (block 1012) optically monitoring, includes a step of (block 1022) capturing at least one intra-intra-test image 116 of the test piece 202. In one or more examples, the step of (block 1022) capturing the intra-intra-test image 116 is performed after removing the test piece 202 from the burner-flame 206 (e.g., block 1004). In one or more examples, the step of (block 1022) capturing the at least one intra-test image 116 is performed before extinguishing of the piece-flame 102 (e.g., block 1010). In one or more examples, the intra-intra-test image 116 represents the intra-test measurements 170. In one or more examples, the intra-test measurements 170 are taken from the intra-intra-test image 116.

In one or more examples, the method 1000, such as the step of (block 1012) optically monitoring, includes a step of (block 1024) capturing at least one post-test image 118 of the test piece 202. In one or more examples, the step of (block 1024) capturing the post-test image 118 is performed after extinguishing of the piece-flame 102 (e.g., block 1010). In one or more examples, the post-test image 118 represents the post-test measurements 172. In one or more examples, the post-test measurements 172 are taken from the post-test image 118.

In one or more examples, according to the method 1000, each one of the pre-test image 114, the intra-intra-test image 116, and the post-test image 118 includes an infrared image 150. In one or more examples, according to the method 1000, each one of the pre-test image 114, the intra-intra-test image 116, and the post-test image 118 includes an X-ray image 152. In one or more examples, according to the method 1000, includes a color image 154. In one or more examples, according to the method 1000, each one of the pre-test image 114, the intra-intra-test image 116, and the post-test image 118 includes one of or a combination of the infrared image 150, the X-ray image 152, and the color image 154.

The various different types of images and/or combinations thereof captured by the optical sensor system 208 and processed by the computer 216 enable the burn characteristics 106 to be evaluated using different image processing techniques and/or applications based on the instance of the flame parameter 120 and/or the burn parameter 110 being measured. Accordingly, the disclosed testing and evaluation systems and methods enable the ability to see beyond the human eye through various imaging technologies (e.g., color, IR, X-ray, and the like).

In one or more examples, according to the method 1000, the step of (block 1026) determining the at least one burn characteristic 106 includes a step of (block 1028) comparing test images 174, including one or more of the post-test images 118, the intra-intra-test images 116, and/or the pre-test images 114. In an example, the post-test image 118 is compared to one or both of the intra-intra-test image 116 and/or the pre-test image 114. In an example, the intra-test image 116 is compared to the pre-test image 114.

In one or more examples, the method 1000 includes a step of (block 1030) determining the base measurement 104 (e.g., pre-test measurement 168) of the at least one burn characteristic 106 using the pre-test image 114. The method 1000 includes a step of (block 1032) determining the test measurement 156 (e.g., the intra-test measurement 170 and/or the post-test measurement 172) of the at least one burn characteristic 106 using at least one of the intra-intra-test image 116 and the post-test image 118. In one or more examples, according to the method 1000, the step of (block 1026) determining the at least one burn characteristic 106 includes a step of (block 1034) comparing the test measurement 156 and the base measurement 104.

In one or more examples, the method 1000 includes a step of (block 1036) evaluating the fire damage 160. Evaluation of the fire damage 160 is a result of the determination of the burn characteristics 106 provided by comparing the test measurements 156 and/or images. In one or more examples, the fire damage 160 is evaluated based on one or more of the burn length 124, the burn duration 126, drippage 128, drip-burn duration 130, and other applicable parameters, for example, as established by burn testing specifications.

In one or more examples, the method 1000 includes a step of (block 1038) digitally storing at least one of the base measurement 104 (e.g., pre-test measurements 168), the test measurement 156 (e.g., intra-test measurements 170 and/or post-test measurements 172), the pre-test image 114, the intra-test image 116, and the post-test image 118.

In one or more examples, the method 1000 includes a step of (block 1040) correlating at least one of the base measurement 104 (e.g., pre-test measurements 168), the test measurement 156 (e.g., intra-test measurements 170 and/or post-test measurements 172), the pre-test image 114, the intra-test image 116, and the post-test image 118 with the test piece 202.

In one or more examples, the method 1000 includes a step of (block 1042) physically storing the test piece 202.

In one or more examples, certain operations described herein as being performed by the system 200, the apparatus 220, and/or according to the method 1000 and/or the method 2000, such as various data-processing operations used to analyze image data and evaluate the fire damage 160 represented by the image, are performed using the computer 216. In one or more examples, the computer 216 includes one or more computing devices, controllers, or combinations thereof. In one or more examples, the computer 216 serves as an evaluation environment and is programmed to perform various operations of the system 200, the apparatus 220, the method 1000, and/or the method 2000. In one or more examples, the computer 216 executes one or more software programs or applications. In one or more examples, the computer 216 includes or takes the form of the data processing system 900 (FIG. 9) that includes a processor 904 and a memory 906 having one or more instances of program code 918 stored thereon. Accordingly, for the purpose of the present disclosure, general reference to the computer 216 may, in some examples, refer to the data processing system 900, components of the data processing system 900, or instructions (e.g., data-processing modules and/or program code applications) that are implemented or executed by the data processing system 900.

Referring generally to FIGS. 1-5 and particularly to FIG. 6, which schematically illustrates an example of a testing environment 226 in which the system 200 operates to evaluate a burn test. The following are examples of the system 200, according to the present disclosure. The system 200 includes various operational or functional elements, features, and/or components. Not all of the elements, features, and/or components described in one example are required in that example. Some or all of the elements, features, and/or components described in one example can be combined with other examples in various ways without the need to include other elements, features, and/or components described in those other examples, even though such combination or combinations are not explicitly described or illustrated by example herein.

In one or more examples, the system 200 includes the optical sensor system 208. The optical sensor system 208 is configured to detect the infrared reflection 148 of the flame 158 on the test piece 202.

In one or more examples, the system 200 includes the computer 216. The computer 216 is programmed to capture initiation of the fire damage 160 to the test piece 202 using the infrared reflection 148.

In one or more examples, the computer 216 is programmed to capture the fire damage 160 though cessation of the fire damage 160 using the infrared reflection 148.

In one or more examples, the computer 216 is programmed to determine the initial location 162 of the fire damage 160 on the test piece 202 to capture the initiation of the fire damage 160.

In one or more examples, the computer 216 is programmed to determine the terminal location 164 of the fire damage 160 on the test piece 202 after the flame 158 extinguishes to capture the fire damage 160 through the cessation of the fire damage 160.

In one or more examples, the computer 216 is programmed to measure the burn length 124 of the fire damage 160 between the initial location 162 and the terminal location 164.

In one or more examples, the optical sensor system 208 is configured to optically measure at least one flame parameter 120 of the piece-flame 102 that is consuming the test piece 202 during the burn test.

In one or more examples, the computer 216 is programmed to determine at least one burn characteristic 106 of the test piece 202 after the piece-flame 102 extinguishes based on the least one flame parameter 120.

In one or more examples, the at least one burn characteristic 106 includes the initial location 162 of the fire damage 160. In one or more examples, the at least one burn characteristic 106 includes the terminal location 164 of the fire damage 160. In one or more examples, the at least one burn characteristic 106 includes the burn length 124 of the fire damage 160, as measured between the initial location 162 and the terminal location 164 of the fire damage 160.

In one or more examples, the at least one burn characteristic 106 includes the burn length 124 as a function of location 144 on the test piece 202.

In one or more examples, the at least one burn characteristic 106 includes the at least one flame parameter 120 as a function of location 144 on the test piece 202.

In one or more examples, the at least one flame parameter 120 of the piece-flame 102 includes at least one of or a combination of the flame profile 138, the heat profile 140, the heat intensity 142, and the temperature 122 of the piece-flame 102.

In one or more examples, the at least one burn characteristic 106 includes the burn duration 126 between removing the test piece 202 from the burner-flame 206 and extinguishing of the piece-flame 102.

In one or more examples, the at least one burn characteristic 106 includes the drippage 128.

In one or more examples, the at least one burn characteristic 106 includes the drip-burn duration 130 between formation of the burning drip 132 and extinguishing of the drip-flame 136.

In one or more examples, the computer 216 is programmed to correlate the at least one flame parameter 120, measured by the optical sensor system 208, to location 144 on the test piece 202.

In one or more examples, the at least one flame parameter 120 of the piece-flame 102 includes at least one of the flame profile 138, the heat profile 140, the heat intensity 142, and the temperature 122 of the piece-flame 102 as a function of location 144 on the test piece 202.

In one or more examples, the optical sensor system 208 includes one or more the optical sensors 212. The optical sensors 212 are configured to capture the test measurements 156 (e.g., the pre-test measurements 168, the intra-test measurements 170, and/or the post-test measurements 172) and/or to capture the test images 174 (e.g., the pre-test images 114, the intra-test images 116, and/or the post-test images 118).

In one or more examples, the optical sensor system 208, such as the one or more optical sensors 212, includes the infrared sensor 210. In one or more examples, the infrared sensor 210 is configured to measure the infrared refraction 146 of the piece-flame 102. In one or more examples, the infrared sensor 210 is configured to measure the infrared reflection 148 of the piece-flame 102. In one or more examples, the infrared sensor 210 is configured to measure the infrared refraction 146 and the infrared reflection 148 of the piece-flame 102.

In one or more examples, the optical sensor system 208, such as the one or more optical sensors 212, includes a camera 214. The camera 214 is configured to capture the pre-test image 114 of the test piece 202 before subjecting the test piece 202 to the burner-flame 206. The camera 214 is configured to capture the intra-intra-test image 116 of the test piece 202 after removing the test piece 202 from the burner-flame 206 and before extinguishing of the piece-flame 102. The camera 214 is configured to capture the post-test image 118 of the test piece 202 after extinguishing of the piece-flame 102.

In one or more examples, the computer 216 is programmed to determine the at least one burn characteristic 106 by comparing the post-test image 118, the intra-intra-test image 116, and/or and the pre-test image 114.

In one or more examples, the optical sensor system 208, such as the one or more optical sensors 212, includes a structural sensor 218. In one or more examples, the structural sensor 218 is configured to generate at least one of the infrared image 150, the X-ray image 152, and the color image 154. In one or more examples, the structural sensor 218 is configured to generate a combination of (e.g., two or more of) the infrared image 150, the X-ray image 152, and/or the color image 154.

In one or more examples, the computer 216 is a tablet computer such as an iPad®, commercially available from Apple, Inc. The computer 216 includes the camera 214 and the infrared sensor 210 as integral components. As an example, the camera 214 and the infrared sensor 210 function as a LiDAR (light detection and ranging) scanner. In one or more examples, the structural sensor 218 is a structure sensor commercially available from XRPro, LLC (Structure). In these examples, the Lidar scanner emits light and captures return or reflected light (e.g., infrared light, laser light, etc.). The computer 216 is programmed with a LiDAR application and an application for interfacing with the structural sensor 218. The infrared light is projected from in the form of a pattern on a surface of the test piece 202. A reflection pattern of the infrared light hits the test piece 202 and returns to the structural sensor 218 through the flame 158.

In one or more examples, the optical sensors 212 of the optical sensor system 208 include a combination of the infrared sensor 210, the camera 214, and the structural sensor 218 to capture the test measurements 156 (e.g., the pre-test measurements 168, the intra-test measurements 170, and/or the post-test measurements 172) and/or to capture test images 174 (e.g., the pre-test images 114, the intra-test images 116, and/or the post-test images 118) in various forms.

In one or more examples, each one of the pre-test image 114, the intra-test image 116, and the post-test image 118 includes or takes the form of one of the infrared image 150, the X-ray image 152, and the color image 154. In one or more examples, each one of the pre-test image 114, the intra-test image 116, and the post-test image 118 includes or takes the form of a combination of the infrared image 150, the X-ray image 152, and/or the color image 154.

In one or more examples, the computer 216 is programmed to determine the base measurement 104 (e.g., pre-test measurements 168) of the at least one burn characteristic 106 using the pre-test image 114.

In one or more examples, the computer 216 is programmed to determine the test measurement 156 (e.g., intra-test measurements 170 and/or post-test measurements 172) of the at least one burn characteristic 106 using at least one of the intra-intra-test image 116 and the post-test image 118.

In one or more examples, the computer 216 is programmed to determine the at least one burn characteristic 106 by comparing the test measurement 156 and the base measurement 104.

In one or more examples, the system 200 includes a database 224. The database 224 is configured to store at least one of the base measurements 104, the test measurements 156, the pre-test images 114, the intra-test images 116, and the post-test images 118.

In one or more examples, the computer 216 is configured to correlate at least one of the base measurements 104, the test measurements 156, the pre-test images 114, the intra-test images 116, and the post-test images 118 with the test piece 202.

In one or more examples, the system 200 includes a non-destructive testing system 222. The non-destructive testing system 222 is configured to pre-screen the test piece 202 before subjecting the test piece 202 to the burner-flame 206 and before optically measuring the measure at least one flame parameter 120.

Referring generally to FIGS. 1-5 and particularly to FIG. 6, which schematically illustrates an example of the testing environment 226 in which the apparatus 220 operates to evaluate a burn test. The following are examples of the apparatus 220, according to the present disclosure. Examples of the apparatus 220 include various operational or functional elements, features, and/or components. Not all of the elements, features, and/or components described in one example are required in that example. Some or all of the elements, features, and/or components described in one example can be combined with other examples in various ways without the need to include other elements, features, and/or components described in those other examples, even though such combination or combinations are not explicitly described or illustrated by example herein.

In one or more examples, the apparatus 220 includes at least one optical sensor 212, such as one or more optical sensors. In one or more examples, the optical sensor system 208 is configured to detect the infrared reflection 148 of the flame 158 on the test piece 202. In one or more examples, the at least one optical sensor is configured to measure at least one flame parameter 120 of the piece-flame 102 that is consuming the test piece 202. In one or more examples, the piece-flame 102 is an example of the flame 158. In one or more examples, the infrared reflection 148 of the flame 158 is an example of the at least one flame parameter 120.

In one or more examples, the data processing system 900 is in communication with the at least one optical sensor 212. The data processing system 900 includes a processor 904 and a memory 906 storing program code 918. In one or more examples, when executed by the processor 904, the program code 918 causes the processor 904 to capture initiation of the fire damage 160 to the test piece 202 using the infrared reflection 148 and to capture the fire damage 160 though cessation of the fire damage 160 using the infrared reflection 148. In one or more examples, when executed by the processor 904, the program code 918 causes the processor 904 to determine at least one burn characteristic 106 of the test piece 202 after the piece-flame 102 extinguishes based on the least one flame parameter 120.

In one or more examples, when executed by the processor 904, the program code 918 causes the processor 904 to determine the initial location 162 of the fire damage 160 on the test piece 202 to capture the initiation of the fire damage 160, to determine the terminal location 164 of the fire damage 160 on the test piece 202 after the flame 158 extinguishes to capture the fire damage 160 through the cessation of the fire damage 160, and to measure the burn length 124 of the fire damage 160 between the initial location 162 and the terminal location 164.

In one or more examples, the at least one burn characteristic 106 includes the initial location 162 of the fire damage 160. In one or more examples, the at least one burn characteristic 106 includes the terminal location 164 of the fire damage 160. In one or more examples, the at least one burn characteristic 106 includes the burn length 124 of the fire damage 160, as measured between the initial location 162 and the terminal location 164 of the fire damage 160.

In one or more examples, the at least one burn characteristic 106 includes the burn length 124 as a function of location 144 on the test piece 202.

In one or more examples, the at least one burn characteristic 106 includes the at least one flame parameter 120 as a function of location 144 on the test piece 202.

In one or more examples, the at least one flame parameter 120 of the piece-flame 102 includes at least one of the flame profile 138, the heat profile 140, the heat intensity 142, and/or the temperature 122 of the piece-flame 102.

In one or more examples, the at least one burn characteristic 106 includes the burn duration 126 between removing the test piece 202 from the burner-flame 206 and extinguishing of the piece-flame 102.

In one or more examples, the at least one burn characteristic 106 includes the drippage 128.

In one or more examples, the at least one burn characteristic 106 includes the drip-burn duration 130 between formation of the burning drip 132 and extinguishing of the drip-flame 136.

In one or more examples, the program code 918, when executed by the processor 904, causes the processor 904 to correlate the at least one flame parameter 120, measured by the optical sensor 212, to location 144 on the test piece 202.

In one or more examples, the at least one flame parameter 120 of the piece-flame 102 includes at least one of the flame profile 138, the heat profile 140, the heat intensity 142, and/or the temperature 122 of the piece-flame 102 as a function of location 144 on the test piece 202.

In one or more examples, the optical sensor 212 includes the infrared sensor 210. In one or more examples, the infrared sensor 210 is configured to measure the infrared refraction 146 of the piece-flame 102. In one or more examples, the infrared sensor 210 is configured to measure the infrared reflection 148 of the piece-flame 102. In one or more examples, the infrared sensor 210 is configured to measure the infrared refraction 146 and the infrared reflection 148 of the piece-flame 102.

In one or more examples, the optical sensor 212 includes the camera 214. The camera 214 captures the pre-test image 114 of the test piece 202. The pre-test image 114 is captured before subjecting the test piece 202 to the burner-flame 206. The camera 214 captures the post-test image 118 of the test piece 202. The post-test image 118 is captured after extinguishing of the piece-flame 102.

In one or more examples, the program code 918, when executed by the processor 904, causes the processor 904 to determine the at least one burn characteristic 106 by comparing the post-test image 118 and the pre-test image 114.

In one or more examples, the optical sensor 212 includes or takes the form of the structural sensor 218. The structural sensor 218 generates at least one of the infrared image 150, the X-ray image 152, and/or the color image 154.

In one or more examples, the camera 214 captures the intra-test image 116 of the test piece 202 after removing the test piece 202 from the burner-flame 206 and before extinguishing of the piece-flame 102.

In one or more examples, the program code 918, when executed by the processor 904, causes the processor 904 to determine the at least one burn characteristic 106 by comparing the post-test image 118, the intra-test image 116, and the pre-test image 114.

In one or more examples, each one of the pre-test image 114, the intra-test image 116, and the post-test image 118 includes at least one of the infrared image 150, the X-ray image 152, and/or the color image 154.

In one or more examples, the program code 918, when executed by the processor 904, causes the processor 904 to determine the base measurement 104 of the at least one burn characteristic 106 using the pre-test image 114.

In one or more examples, the program code 918, when executed by the processor 904, causes the processor 904 to determine a test measurement 156 of the at least one burn characteristic 106 using at least one of the intra-test image 116 and the post-test image 118.

In one or more examples, the program code 918, when executed by the processor 904, causes the processor 904 to determine the at least one burn characteristic 106 by comparing the test measurement 156 and the base measurement 104.

In one or more examples, the apparatus 220 includes the database 224. The database 224 stores at least one of the base measurement 104, the test measurement 156, the pre-test image 114, the intra-test image 116, and the post-test image 118.

In one or more examples, the program code 918, when executed by the processor 904, causes the processor 904 to correlate at least one of the base measurement 104, the test measurement 156, the pre-test image 114, the intra-test image 116, and the post-test image 118 with the test piece 202.

Referring generally to FIGS. 1-5 and particularly to FIG. 9, which schematically illustrates an example of the data processing system 900 that operates to evaluate a burn test. For example, the data processing system 900 can be used to implement the computer 216 (FIG. 6) or other computer-implemented components of the system 200 (FIG. 6) and/or the apparatus 220 (FIG. 6). The following are examples of the data processing system 900, according to the present disclosure. Examples of the data processing system 900 includes various operational or functional elements, features, and/or components. Not all of the elements, features, and/or components described in one example are required in that example. Some or all of the elements, features, and/or components described in one example can be combined with other examples in various ways without the need to include other elements, features, and/or components described in those other examples, even though such combination or combinations are not explicitly described or illustrated by example herein.

In one or more examples, the data processing system 900 includes a processor 904, a memory 906, and at least one program code 918. The memory 906 stores the program code 918. When executed by the processor 904, the program code 918 causes the processor 904 to perform one or more of the operations or steps described herein with respect to the system 200 (FIG. 6) and/or the apparatus 220 (FIG. 6).

When executed by the processor 904, the program code 918 causes the processor 904 to perform one or more of the operations or steps for implementation of the method 2000 (FIG. 7). In one or more examples, when executed by the processor 904, the program code 918 causes the processor 904 to: (1) detect the infrared reflection 148 of the flame 158 on the test piece 202; (2) capture initiation of the fire damage 160 to the test piece 202 using the infrared reflection 148; and (3) capture the fire damage 160 though cessation of the fire damage 160 using the infrared reflection 148.

When executed by the processor 904, the program code 918 causes the processor 904 to perform one or more of the operations or steps for implementation of the method 1000 (FIG. 8). In one or more examples, when executed by the processor 904, the program code 918 causes the processor 904 to: (1) optically monitor the test piece 202 while subjecting the test piece 202 to the burner-flame 206; (2) optically monitor the test piece 202 after removing the test piece 202 from the burner-flame 206; and (3) determine at least one burn characteristic 106 of the test piece 202 after the piece-flame 102 extinguishes.

Referring now to FIG. 9, in one or more examples, the data processing system 900 includes a communications framework 902, which provides communications between the processor 904, storage devices 916, a communications unit 910, an input/output unit 912, and a display 914. In some cases, the communications framework 902 is implemented as a bus system.

In one or more examples, the processor 904 is configured to execute instructions for software to perform a number of operations. The processor 904 includes at least one of a number of processor units, a multi-processor core, or some other type of processor, depending on the implementation. In some examples, the processor 904 takes the form of a hardware unit, such as a circuit system, an application specific integrated circuit (ASIC), a programmable logic device, or some other suitable type of hardware unit.

In one or more examples, instructions for the operating system, applications, and programs run by the processor 904 are located in the storage devices 916. The storage devices 916 are in communication with the processor 904 through the communications framework 902. As used herein, a storage device, also referred to as a computer-readable storage device, is any piece of hardware capable of storing information on a temporary basis, a permanent basis, or both. This information may include, but is not limited to, data, program code, other information, or some combination thereof.

The memory 906 and a persistent storage 908 are examples of the storage devices 916. In one or more examples, the memory 906 takes the form of, for example, a random-access memory or some type of volatile or non-volatile storage device. In one or more examples, the persistent storage 908 includes any number of components or devices. For example, the persistent storage 908 includes a hard drive, a flash memory, a rewritable optical disk, a rewritable magnetic tape, or some combination of the above. The media used by the persistent storage 908 may or may not be removable.

The communications unit 910 allows the data processing system 900 to communicate with other data processing systems, other computer-implemented devices, or both, such as the optical sensor system 208. The communications unit 910 may provide communications using physical communications links, wireless communications links, or both.

The input/output unit 912 allows input to be received from and output to be sent to other devices connected to the data processing system 900. As an example, the input/output unit 912 enables user input to be received, for example, through a keyboard, a mouse, some other type of input device, or a combination thereof connected to the data processing system 900. As another example, the input/output unit 912 enables output to be sent, for example, to a printer or the display 914 connected to the data processing system 900.

The display 914 is configured to display information to a user. The display 914 may include, for example, without limitation, a monitor, a touch screen, a laser display, a holographic display, a virtual display device, some other type of display device, or a combination thereof.

In this illustrative example, the processes of the different illustrative embodiments are performed by the processor 904 using computer-implemented instructions. These instructions are referred to as program code, computer-usable program code, or computer-readable program code and are read and/or executed by the processor 904.

In these examples, the program code 918 is located in a functional form on computer-readable media 920, which is selectively removable, and may be loaded onto or transferred to the data processing system 900 for execution by the processor 904. The program code 918 and the computer-readable media 920 together form a computer program product 922. In the illustrative example, the computer-readable media 920 is a computer-readable storage media 924 or a computer-readable signal media.

In one or more examples, the computer-readable storage media 924 is a physical or tangible storage device used to store the program code 918 rather than a medium that propagates or transmits the program code 918. The computer-readable storage media 924 is, for example, without limitation, an optical or magnetic disk or a persistent storage device that is connected to the data processing system 900.

Alternatively, the program code 918 can be transferred to the data processing system 900 using the computer-readable signal media. The computer-readable signal media can be, for example, a propagated data signal containing the program code 918. This data signal may be an electromagnetic signal, an optical signal, or some other type of signal that can be transmitted over physical communications links, wireless communications links, or both.

The illustration of the data processing system 900 in FIG. 9 is not meant to provide architectural limitations to the manner in which the illustrative embodiments may be implemented. The different illustrative examples may be implemented in a data processing system that includes components in addition to or in place of those illustrated for the data processing system 900. Further, components shown in FIG. 9 may be varied from the illustrative examples shown.

By way of examples, the present disclosure is also directed to the computer program product 922. The computer program product 922 includes instructions (e.g., program code 918) read and executed by the computer 216. When executed by the computer 216 or the processor 904, the instructions cause the computer 216 or the processor 904 to perform at least some of the operations or steps associated with the method 1000 and/or the method 2000.

In one or more examples, when executed by the computer 216 or the processor 904, the instructions cause the computer 216 or the processor 904 to carry out one or more steps of: (1) detecting the infrared reflection 148 of the flame 158 on the test piece 202; (2) capturing initiation of the fire damage 160 to the test piece 202 using the infrared reflection 148; and (3) capturing the fire damage 160 though cessation of the fire damage 160 using the infrared reflection 148.

In one or more examples, when executed by the computer 216 or the processor 904, the instructions cause the computer 216 or the processor 904 to carry out one or more steps of: (1) optically monitor the test piece 202 while subjecting the test piece 202 to the burner-flame 206; (2) optically monitor the test piece 202 after removing the test piece 202 from the burner-flame 206; and (3) determine at least one burn characteristic 106 of the test piece 202 after the piece-flame 102 extinguishes.

By way of examples, the present disclosure is further directed to the computer-readable storage media 924. The computer-readable storage media 924 includes instructions (e.g., program code 918) executed by the computer 216 or the processor 904. When executed by the computer 216 or the processor 904, the instructions cause the computer 216 or the processor 904 to perform at least some of the operations or steps associated with the method 1000 and/or the method 2000.

In one or more examples, when executed by the computer 216 or the processor 904, the instructions cause the computer 216 or the processor 904 to carry out one or more steps of: (1) detecting the infrared reflection 148 of the flame 158 on the test piece 202; (2) capturing initiation of the fire damage 160 to the test piece 202 using the infrared reflection 148; and (3) capturing the fire damage 160 though cessation of the fire damage 160 using the infrared reflection 148.

In one or more examples, when executed by the computer 216 or the processor 904, the instructions cause the computer 216 or the processor 904 to carry out one or more steps of: (1) optically monitor the test piece 202 while subjecting the test piece 202 to the burner-flame 206; (2) optically monitor the test piece 202 after removing the test piece 202 from the burner-flame 206; and (3) determine at least one burn characteristic 106 of the test piece 202 after the piece-flame 102 extinguishes.

Figure 10:
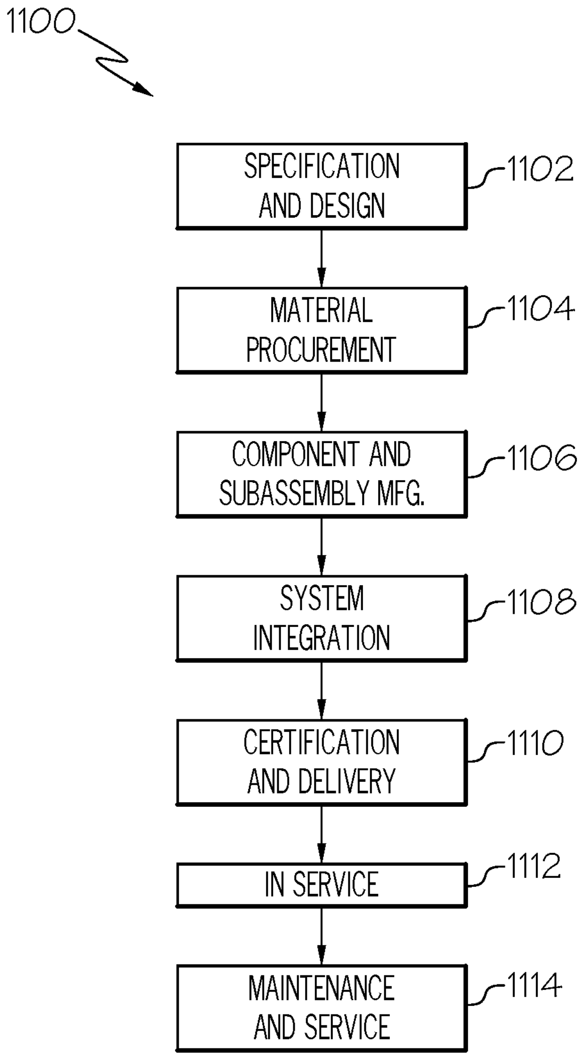
FIG. 10 is a flow diagram of an example of an aircraft manufacturing and service method.
Figure 11:
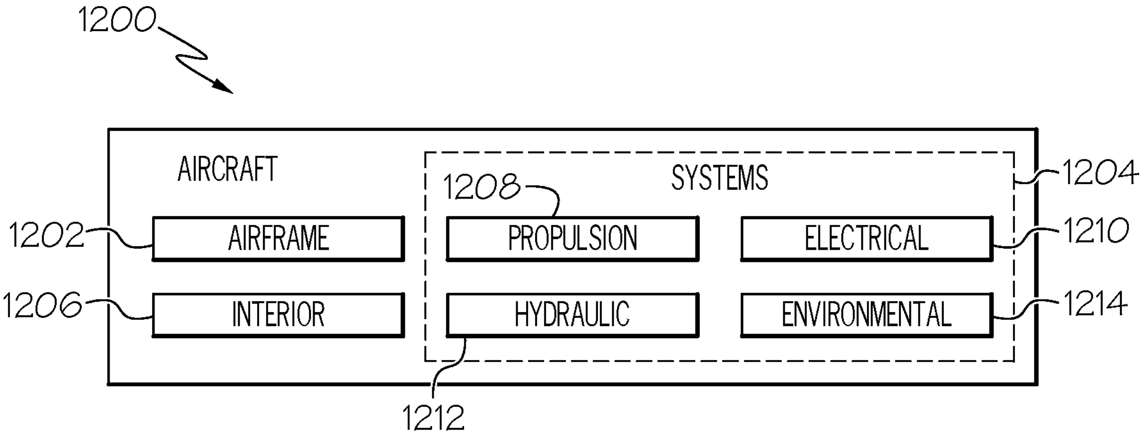
FIG. 11 is a schematic block diagram of an example of an aircraft.

Referring now to FIGS. 10 and 11, examples of the system 200, the apparatus 220, the method 1000, and/or the method 2000 described herein, may be related to, or used in the context of, an aircraft manufacturing and service method 1100, as shown in the flow diagram of FIG. 10 and an aircraft 1200, as schematically illustrated in FIG. 11. As an example, the aircraft 1200 and/or the aircraft production and service method 1100 may include one or more components having been evaluated using the system 200, the apparatus 220 and/or according to the method 1000 and/or the method 2000.

Referring to FIG. 11, which illustrates an example of the aircraft 1200. In one or more examples, the aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208. Other examples of the onboard systems 1204 include hydraulic systems 1212, electrical systems 1210, and environmental systems 1214. In other examples, the onboard systems 1204 also includes one or more control systems coupled to an airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. One or more components of the aircraft 1200 are manufactured from materials subjected to the burn test and evaluated according to the systems and methods disclosed herein.

Referring to FIG. 10, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 10 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 200, the apparatus 220, the method 1000, and the method 2000 shown and described herein, may be employed during any one or more of the stages of the manufacturing and service method 1100 shown in the flow diagram illustrated by FIG. 10. In an example, components of the aircraft 1200 and/or materials of the components as represented by test pieces 202 (e.g., test specimen of the components and/or materials) tested and evaluated using the system 200 and/or according to the methods 1000 and 2000 may form a portion of component and subassembly manufacturing (block 1106) and/or system integration (block 1108). Further, components of the aircraft 1200 and/or materials of the components as represented by test pieces 202 (e.g., test specimen of the components and/or materials) tested and evaluated using the system 200 and/or according to the methods 1000 and 2000 may be implemented in a manner similar to components or subassemblies prepared while the aircraft 1200 is in service (block 1112). Also, components of the aircraft 1200 and/or materials of the components as represented by test pieces 202 (e.g., test specimen of the components and/or materials) tested and evaluated using the system 200 and/or according to the methods 1000 and 2000 may be utilized during system integration (block 1108) and certification and delivery (block 1110). Similarly, components of the aircraft 1200 and/or materials of the components as represented by test pieces 202 (e.g., test specimen of the components and/or materials) tested and evaluated using the system 200 and/or according to the methods 1000 and 2000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term “approximately” refers to or represents a condition that is close to, but not exactly, the stated condition that still performs the desired function or achieves the desired result. As an example, the term “approximately” refers to a condition that is within an acceptable predetermined tolerance or accuracy, such as to a condition that is within 10% of the stated condition. However, the term “approximately” does not exclude a condition that is exactly the stated condition. As used herein, the term “substantially” refers to a condition that is essentially the stated condition that performs the desired function or achieves the desired result.

FIGS. 1-6, 9 and 11, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-6, 9 and 11, referred to above, need be included in every example and not all elements, features, and/or components described herein are necessarily depicted in each illustrative example. Accordingly, some of the elements, features, and/or components described and illustrated in FIGS. 1-6, 9 and 11 may be combined in various ways without the need to include other features described and illustrated in FIGS. 1-6, 9 and 11, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-6, 9 and 11, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-6, 9 and 11, and such elements, features, and/or components may not be discussed in detail herein with reference to each of FIGS. 1-6, 9 and 11. Similarly, all elements, features, and/or components may not be labeled in each of FIGS. 1-6, 9 and 11, but reference numerals associated therewith may be utilized herein for consistency.

In FIGS. 7, 8 and 10, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 7, 8 and 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the methods 1000 and 2000, the system 200, and the apparatus 220, as well as various examples of the data processing system 900, the computer program product 922, and the computer-readable storage media 924 used to implement the methods 1000 and 2000, the system 200, and/or the apparatus 220, have been shown and described, modifications may occur to those skilled in the art upon reading the specification. The present application includes such modifications and is limited only by the scope of the claims.

What is claimed is:

1. A method for evaluating a burn test, the method comprising:

projecting infrared light on a surface of a test piece;

subjecting the test piece to a flame;

detecting an infrared reflection of the infrared light from the test piece through the flame;

capturing initiation of fire damage to the test piece using the infrared reflection;

capturing the fire damage through cessation of the fire damage using the infrared reflection; and evaluating the fire damage.

2. The method of claim 1, wherein:

detecting the infrared reflection of the flame on the test piece comprises optically monitoring the test piece using at least one optical sensor;

capturing initiation of the fire damage comprises determining an initial location of the fire damage on the test piece;

capturing the fire damage comprises determining a terminal location of the fire damage on the test piece after the flame extinguishes; and evaluating the fire damage comprises determining a burn length of the fire damage between the initial location and the terminal location.

3. A method for evaluating a burn test, the method comprising:

projecting infrared light on a surface of a test piece;

optically monitoring the test piece while subjecting the test piece to a burner-flame and after removing the test piece from the burner-flame, wherein optically monitoring comprises optically measuring an infrared reflection of a piece-flame; and determining at least one burn characteristic of the test piece after the piece-flame extinguishes.

4. The method of claim 3, wherein the at least one burn characteristic comprises at least one of a burn length as a function of location on the test piece and a burn duration between removing the test piece from the burner-flame and extinguishing of the piece-flame.

5. The method of claim 4, wherein the at least one burn characteristic further comprises:

drippage; and a drip-burn duration between formation of a burning drip and extinguishing of a drip-flame.

6. The method of claim 3, further comprising:

optically measuring at least one flame parameter, comprising at least one of a flame profile of the piece-flame, a heat profile of the piece-flame, a heat intensity of the piece-flame, and a temperature of the piece-flame; and correlating the at least one flame parameter to location on the test piece.

7. The method of claim 3, wherein optically monitoring comprises optically measuring an infrared refraction of the piece-flame.

8. The method of claim 6, wherein optically measuring the at least one flame parameter of the piece-flame is performed using an infrared sensor.

9. The method of claim 3, wherein optically monitoring is performed using an infrared sensor.

10. The method of claim 3, further comprising:

capturing a pre-test image of the test piece before subjecting the test piece to the burner-flame;

capturing at least one intra-test image of the test piece after removing the test piece from the burner-flame and before extinguishing of the piece-flame; and capturing a post-test image of the test piece after extinguishing of the piece-flame, wherein determining the at least one burn characteristic comprises comparing the post-test image, intra-test image, and the pre-test image.

11. The method of claim 10, wherein each one of the pre-test image, the intra-test image, and the post-test image comprises at least one of an infrared image, an X-ray image, or a color image.

12. The method of claim 10, further comprising:

determining a base measurement of the at least one burn characteristic using the pre-test image; and determining a test measurement of the at least one burn characteristic using at least one of the intra-test image and the post-test image, wherein determining the at least one burn characteristic comprises comparing the test measurement and the base measurement.

13. The method of claim 12, further comprising:

correlating at least one of the base measurement, the test measurement, the pre-test image, the intra-test image, and the post-test image with the test piece;

digitally storing at least one of the base measurement, the test measurement, the pre-test image, the intra-test image, and the post-test image; and physically storing the test piece.

14. The method of claim 3, further comprising pre-screening the test piece before subjecting the test piece to the burner-flame and optically monitoring the test piece.

15. A system for evaluating a burn test, the system comprising:

a structure sensor configured to project infrared light on a surface of a test piece;

an optical sensor system configured to detect an infrared reflection from the test piece through a flame consuming the test piece; and a computer programmed to:

capture initiation of fire damage to the test piece using the infrared reflection; and capture the fire damage through cessation of the fire damage using the infrared reflection.

16. The system of claim 15, wherein the computer is programmed to:

determine an initial location of the fire damage on the test piece to capture the initiation of the fire damage;

determine a terminal location of the fire damage on the test piece after the flame extinguishes to capture the fire damage through the cessation of the fire damage; and measure a burn length of the fire damage between the initial location and the terminal location.

17. The system of claim 15, wherein:

the optical sensor system is configured to optically measure at least one flame parameter of the flame that is consuming the test piece during the burn test;

the computer is programmed to determine at least one burn characteristic of the test piece after the flame extinguishes based on the least one flame parameter;

the at least one flame parameter of the flame comprises at least one of a flame profile, a heat profile, a heat intensity, and a temperature of the flame; and the at least one burn characteristic comprises at least one of a burn length as a function of location on the test piece, a burn duration between removing the test piece from a burner-flame and extinguishing of the flame, and the at least one flame parameter as a function of the location on the test piece.

18. The system of claim 15, wherein the optical sensor system comprises an infrared sensor configured to measure at least one of an infrared refraction of the flame and the infrared reflection of the flame.

19. The system of claim 15, wherein:

the optical sensor system is further configured to:

capture a pre-test image of the test piece before subjecting the test piece to the flame;

a intra-test image of the test piece after removing the test piece from the flame and before extinguishing of the flame; and a post-test image of the test piece after extinguishing of the flame;

the computer is programmed to determine at least one burn characteristic by comparing the post-test image, the intra-test image, and the pre-test image; and each one of the pre-test image, the intra-test image, and the post-test image comprises at least one of an infrared image, an X-ray image, or a color image.

20. The system of claim 15, further comprising a non-destructive testing system configured to pre-screen the test piece before subjecting the test piece to the flame and optically measuring at least one flame parameter.

* * * * *